(12) United States Patent
Ogawa

(10) Patent No.: US 10,958,825 B2
(45) Date of Patent: Mar. 23, 2021

(54) ELECTRONIC APPARATUS AND METHOD FOR CONTROLLING THE SAME

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 89 days.

(21) Appl. No.: 16/158,431

(22) Filed: Oct. 12, 2018

(65) Prior Publication Data
US 2019/0116318 A1   Apr. 18, 2019

(30) Foreign Application Priority Data

Oct. 17, 2017 (JP) .............................. JP2017-201248
Oct. 17, 2017 (JP) .............................. JP2017-201249
Dec. 25, 2017 (JP) .............................. JP2017-248004

(51) Int. Cl.
*H04N 5/232* (2006.01)
*H04N 5/225* (2006.01)
*G03B 13/00* (2006.01)
*G06K 9/00* (2006.01)

(52) U.S. Cl.
CPC ......... *H04N 5/232127* (2018.08); *G06K 9/00* (2013.01); *H04N 5/23216* (2013.01); *H04N 5/23219* (2013.01); *H04N 5/232945* (2018.08)

(58) Field of Classification Search
CPC ......... H04N 5/232127; H04N 5/23216; H04N 5/23219; H04N 5/23212; H04N 5/23218; H04N 5/232945; H04N 5/232933
See application file for complete search history.

(56) References Cited

U.S. PATENT DOCUMENTS

| | | | |
|---|---|---|---|
| 2010/0149402 A1* | 6/2010 | Aoki | H04N 5/23212 348/333.12 |
| 2016/0241775 A1* | 8/2016 | Fukuda | G02B 7/365 |
| 2018/0348470 A1* | 12/2018 | Suzuki | H04N 5/23229 |
| 2019/0278052 A1* | 9/2019 | Kikuchi | G02B 7/34 |

FOREIGN PATENT DOCUMENTS

JP    2013-070164 A    4/2013

* cited by examiner

*Primary Examiner* — Kelly L Jerabek
(74) *Attorney, Agent, or Firm* — Cowan, Liebowitz & Latman, P.C.

(57) ABSTRACT

An electronic apparatus performs control to divide a face region based on the size of a face detected by the detection unit into three regions, namely an upper left region, an upper right region, and a lower region, viewed in a direction opposing the face, and select a left side eye, viewed opposing the face, when a position inside the upper left region is designated by the designation unit, a right side eye, viewed opposing the face, when a position inside the upper right region is designated by the designation unit, and the face when a position inside the lower region is designated by the designation unit.

20 Claims, 18 Drawing Sheets

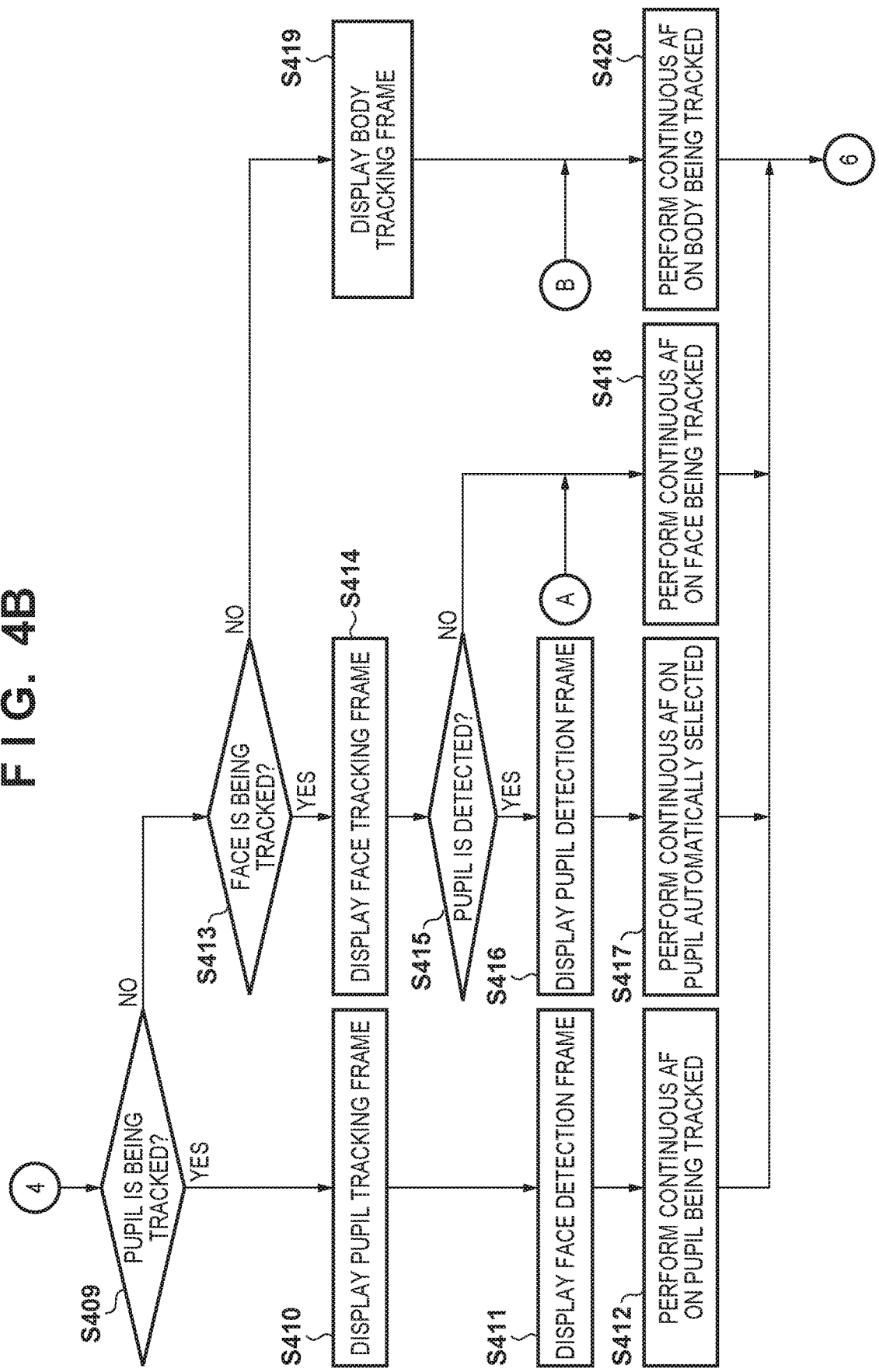

F I G. 5A
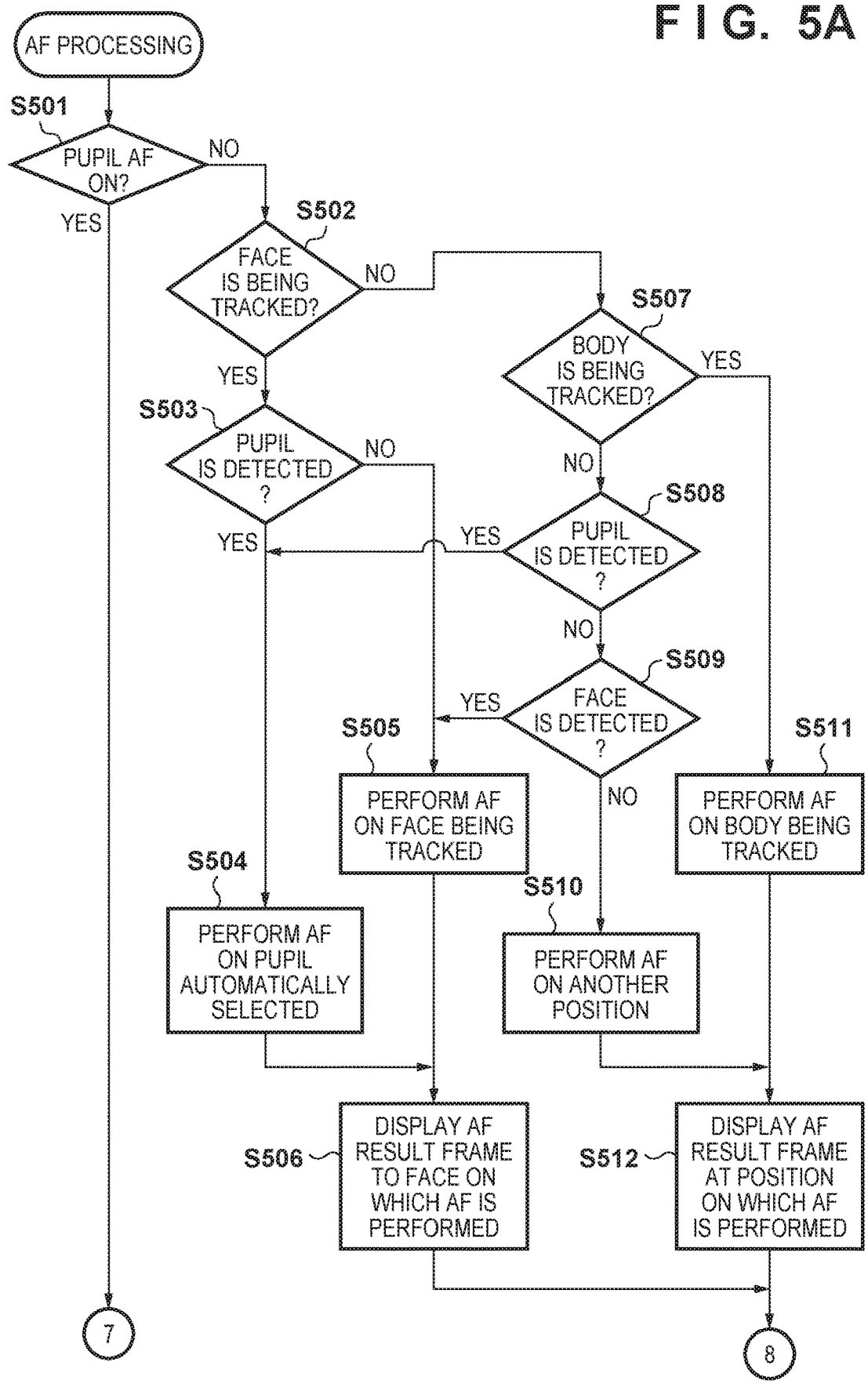

ELECTRONIC APPARATUS AND METHOD FOR CONTROLLING THE SAME

BACKGROUND OF THE INVENTION

Field of the Invention

The present invention relates to an electronic apparatus and a method for controlling the same.

Description of the Related Art

Most conventional digital cameras can automatically bring an object automatically detected by the camera or an object arbitrarily selected by a user into focus (autofocus (AF)). Particularly, in recent years, cameras are known that have realized AF on a precise position in an object by not only detecting a face, as the object, but also detecting an organ on the face (such as a pupil, for example).

It is important that these cameras have a specification in which the user's intention can be reflected by allowing the user to select which of the face and the pupil is the AF target position. For example, in Japanese Patent Laid-Open No. 2013-70164 (hereinafter, referred to as Document 1), a technique is described in which, when the user has touched an LCD screen, which of the face and the pupil is at the touched position is determined, and as a result, one of the face and the pupil is selected as the AF target. In Document 1, if the size of the pupil on the LCD screen is small, the reaction region for selecting the pupil by touching is enlarged. With this, the user can easily designate the AF target position according to the shooting scene, and a camera having high usability can be realized.

However, in Document 1, the specific area of the reaction region for selecting the pupil by touching is not described. If the reaction region is enlarged because the pupil is small, for example, the reaction region for selecting the face is reduced, which makes it difficult for the user to intuitively differentiate and select between the face and pupil.

Also, in Document 1, when the pupil is selected, the AF target position is invariably the pupil, and when the face is selected, the AF target position is invariably the face. Therefore, even if "pupil AF ON (operation mode in which operations are performed with the pupil being the AF target)" is set, if the user selects a face on the LCD screen, the face is set as the AF target. In this case, even if AF can be performed on the pupil, the camera cannot notify the user of this fact. As result, it is possible that the user feels that AF could not be performed on the pupil, and repeats the AF operation, which extends the situation in which shooting is not possible.

SUMMARY OF THE INVENTION

One embodiment of the present invention has been achieved in light of the above-described circumstances, and aims to provide a technique for allowing a user to easily and reliably designate a face or an organ of the face displayed on a display screen.

Also, one embodiment of the present invention aims to provide a technique for displaying the result of AF in accordance with user intention by controlling the display of the result of AF according to the operation mode set by the user.

According to one aspect of the present invention, there is provided an electronic apparatus comprising: at least one processor or circuit to perform operations of: a detection unit configured to be able to detect a face and eyes of the face from an image; a designation unit configured to designate a position on a display screen in which the image is displayed, in a display unit; and a control unit configured to perform control to divide a face region based on the size of a face detected by the detection unit into three regions, namely an upper left region, an upper right region, and a lower region, viewed in a direction opposing the face, and select a left side eye, viewed opposing the face, when a position inside the upper left region is designated by the designation unit, a right side eye, viewed opposing the face, when a position inside the upper right region is designated by the designation unit, and the face when a position inside the lower region is designated by the designation unit.

According to another aspect of the present invention, there is provided an electronic apparatus comprising: at least one processor or circuit to perform operations of: a detection unit configured to detect a face and a predetermined organ of the face from an image; a designation unit configured to designate a position on a display screen in which the image is displayed, a control unit configured to, if the face and the predetermined organ are detected, set a face region corresponding to the face on the display screen, divide the face region into a plurality of regions, and associate the regions with the face and the predetermined organ, and a selection unit configured to select the face or the predetermined organ that is associated with the region displayed at a position designated by the designation unit, of the plurality of regions, wherein the control unit is configured to divide the face region into a plurality of regions based on a predetermined rule that does not depend on a size of an organ relative to the detected face.

According to another aspect of the present invention, there is provided a method of controlling an electronic apparatus, comprising: detecting a face and eyes of the face from an image; accepting designation of a position on a display screen in which the image is displayed, in a display unit; and controlling to divide a face region based on the size of a detected face into three regions, namely an upper left region, an upper right region, and a lower region, viewed in a direction opposing the face, and select a left side eye, viewed opposing the face, when accepting designation of a position inside the upper left region, a right side eye, viewed opposing the face, when accepting designation of a position inside the upper right region, and the face when accepting designation of a position inside the lower region.

According to another aspect of the present invention, there is provided a method of controlling an electronic apparatus, comprising: detecting a face and a predetermined organ of the face from an image; accepting designation of a position on a display screen in which the image is displayed; if the face and the predetermined organ are detected, setting a face region corresponding to the face on the display screen, dividing the face region into a plurality of regions, and associating the regions with the face and the predetermined organ, and selecting the face or the predetermined organ that is associated with the region displayed at a designated position, of the plurality of regions, wherein, in the dividing the face region into a plurality of regions, the face region is divided into a plurality of regions based on a predetermined rule that does not depend on a size of an organ relative to the detected face.

According to another aspect of the present invention, there is provided a non-transitory computer-readable storage medium that stores a program for causing a computer to execute a method for controlling an electronic apparatus, the method for controlling comprising: detecting a face and eyes of the face from an image; accepting designation of a position on a display screen in which the image is displayed, in a display unit; and controlling to divide a face region based on the size of a detected face into three regions, namely an upper left region, an upper right region, and a lower region, viewed in a direction opposing the face, and select a left side eye, viewed opposing the face, when accepting designation of a position inside the upper left region, a right side eye, viewed opposing the face, when accepting designation of a position inside the upper right region, and the face when accepting designation of a position inside the lower region.

According to another aspect of the present invention, there is provided a non-transitory computer-readable storage medium that stores a program for causing a computer to execute a method for controlling an electronic apparatus, the method for controlling comprising: detecting a face and a predetermined organ of the face from an image; accepting designation of a position on a display screen in which the image is displayed; if the face and the predetermined organ are detected, setting a face region corresponding to the face on the display screen, dividing the face region into a plurality of regions, and associating the regions with the face and the predetermined organ, and selecting the face or the predetermined organ that is associated with the region displayed at a designated position, of the plurality of regions, wherein, in the dividing the face region into a plurality of regions, the face region is divided into a plurality of regions based on a predetermined rule that does not depend on a size of an organ relative to the detected face.

According to another aspect of the present invention, there is provided an electronic apparatus comprising at least one processor or circuit to perform operations of: a detection unit configured to detect a face and an organ of the face from an image; a designation unit configured to designate a face or an organ detected by the detection unit as an AF target; a setting unit configured to set one of a plurality of operation modes in which the AF targets designated by the designation unit are different, an AF control unit configured to perform control such that AF is performed on an AF target designated by the designation unit, and a display control unit configured to cause a display unit to display an AF result so as to be superimposed on the image, wherein, when a first operation mode is set in which a face and an organ can be set as the AF target, even if a face is designated by the designation unit as the AF target, the AF control unit sets, if an organ of the designated face is detected by the detection unit, the detected organ as the AF target, and the display control unit displays the result of AF to the detected organ.

According to another aspect of the present invention, there is provided a method of controlling an electronic apparatus, comprising: detecting a face and an organ of the face from an image; designating the detected face or organ as an AF target; setting one of a plurality of operation modes in which AF targets that can be designated are different; controlling so as to perform AF on an AF target designated in the designating; and causing a display unit to display a result of AF so as to be superimposed on the image, wherein, when a first operation mode, of the plurality of operation modes, is set in which a face and an organ can be designated as the AF target, if an organ of the designated face is detected even if a face is designated as the AF target, the detected organ is set as the AF target, and the result of AF is displayed to the detected organ.

According to another aspect of the present invention, there is provided a non-transitory computer-readable storage medium that stores a program for causing a computer to execute a method for controlling an electronic apparatus, the method for controlling comprising: detecting a face and an organ of the face from an image; designating the detected face or organ as an AF target; setting one of a plurality of operation modes in which AF targets that can be designated are different; controlling so as to perform AF on an AF target designated in the designating; and causing a display unit to display an AF result so as to be superimposed on the image, wherein, when a first operation mode, of the plurality of operation modes, is set in which a face and an organ can be designated as the AF target, if an organ of the designated face is detected even if a face is designated as the AF target, the detected organ is set as the AF target, and the result of AF is displayed to the detected organ.

Further features of the present invention will become apparent from the following description of exemplary embodiments (with reference to the attached drawings).

BRIEF DESCRIPTION OF THE DRAWINGS

FIGS. 4A to 4C are flowcharts illustrating frame display processing in the embodiment.

FIGS. 5A to 5B are flowcharts illustrating AF processing in the embodiment.

DESCRIPTION OF THE EMBODIMENTS

An embodiment of the present invention will be described below with reference to the drawings. Note that, in the embodiment described below, a case where an electronic apparatus and a method of controlling the same according to the present invention are applied to a digital camera that can shoot still images and moving images will be described, as an example.

Figure 1:
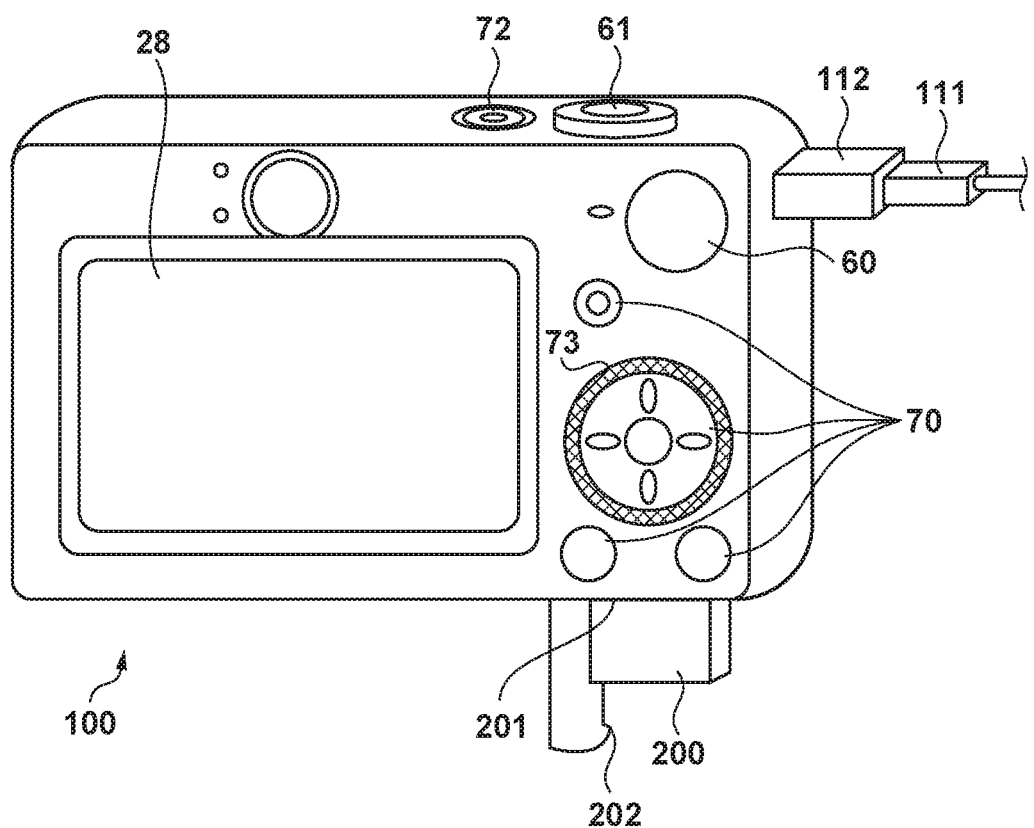
FIG. 1 is an external view of a camera in an embodiment.

A backside external view of a digital camera 100, which is an example of an image capture apparatus according to the present embodiment is shown in FIG. 1. A display unit 28 is a display unit that displays images and various information. The display unit 28 includes, as will be described in FIG. 2, a backside display panel 28a and an electronic viewfinder 28b, which is a display unit inside a viewfinder. A shutter button 61 is an operation unit for shooting. A mode switching button 60 is an operation unit for switching between various modes. A connector 112 is an interface that connects a connection cable 111 for connecting to an external device such as a personal computer or a printer with a digital camera 100. An operation unit 70 includes operation members such as various switches, buttons and a touch panel operated in various ways by the user. A controller wheel 73 is a rotatable operation member included in the operation unit 70. A power switch 72 is a push-button for switching between power on and power off.

A memory medium 200 includes a memory card or a hard disk, for example, and stores images captured by the digital camera 100 and the like. A memory medium slot 201 is for detachably accommodating the memory medium 200. The memory medium 200 accommodated in the memory medium slot 201 can communicate with the digital camera 100, and recording and reproduction become possible. A cover 202 covers the memory medium slot 201. FIG. 1 shows a state in which the cover 202 is opened, and a portion of the memory medium 200 is extracted from the memory medium slot 201 and exposed.

Figure 2:
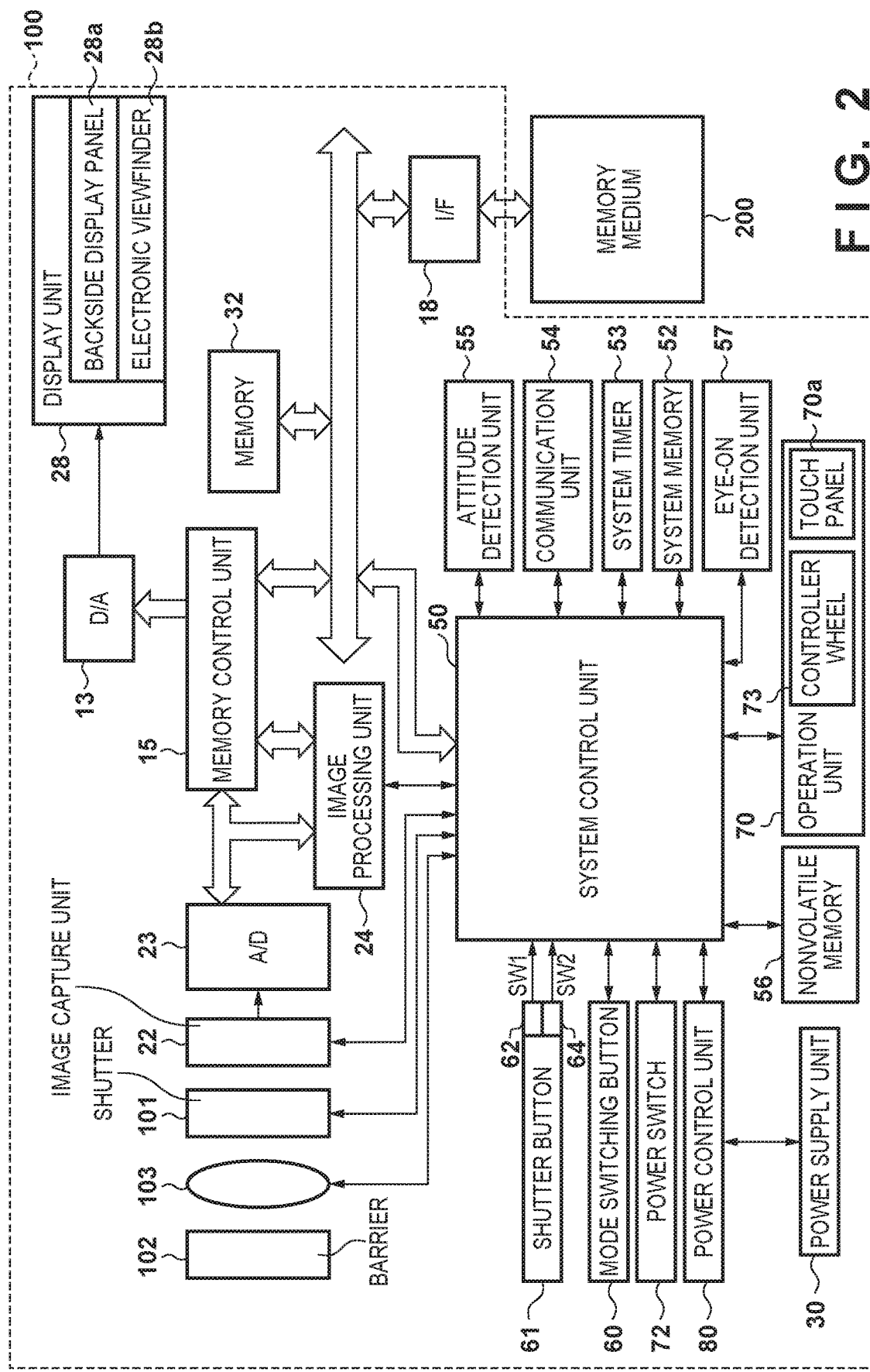
FIG. 2 is a functional block diagram illustrating an exemplary configuration of the camera in the embodiment.

FIG. 2 is a block diagram illustrating an exemplary configuration of the digital camera 100 according to the present embodiment. In FIG. 2, an image sensing lens 103 is a lens group including a zoom lens and a focusing lens. A shutter 101 is a shutter that has a diaphragm function. An image capture unit 22 is an image sensor constituted by a CCD or CMOS or the like, for converting the optical image of an object to an electric signal. An A/D converter 23 converts an analog signal to a digital signal. The A/D converter 23 is used for converting an analog signal output from the image capture unit 22 to a digital signal. A barrier 102 covers the image capturing system which includes the image sensing lens 103 of the digital camera 100, thereby preventing contamination of and damage to the image capturing system that includes the image sensing lens 103, shutter 101 and image capturing unit 22.

The image processing unit 24 performs resizing processing such as predetermined pixel interpolation and reduction, and color conversion processing, with respect to the data from the A/D converter 23 or the data from a memory control unit 15. Also, the image processing unit 24 performs predetermined calculation processing using the captured image data. The system control unit 50 performs exposure control and distance measuring control based on the calculation results obtained by the image processing unit 24. Thus, AF (Autofocus) processing, AE (Automatic Exposure) processing, and EF (flash pre-emission) processing of TTL (Through the Lens) type are performed. The image processing unit 24 further performs predetermined calculation processing using the captured image data, and AWB (Automatic White Balance) processing of TTL type is performed based on the calculation results.

The data output from the A/D converter 23 is directly written into a memory 32 via both the image processing unit 24 and the memory control unit 15 or via the memory control unit 15. The memory 32 stores image data that was obtained by the image capture unit 22 and has been converted to digital data by the A/D converter 23, and image data for displaying in the display unit 28. The memory 32 has a storage capacity that is sufficient for storing a predetermined number of still images as well as moving images and audio for a predetermined time period.

The memory 32 also functions as a memory for image display (video memory). A D/A converter 13 converts the image display data stored in the memory 32 into an analog signal and supplies the display unit 28 with the analog signal. The image display data that was written into the memory 32 is displayed by the display unit 28 via the D/A converter 13. The display unit 28 performs, in a display device such as an LCD, display in accordance with the analog signal from the D/A converter 13. The digital signals obtained by A/D conversion performed by the A/D converter 23 and stored in the memory 32 are converted into analog signals by the D/A converter 13, and the analog signals are successively transmitted to the display unit 28 so as to be displayed thereon, making it possible to realize a through-the lens image display (live view display (LV display)). Hereinafter, an image displayed in the live view is referred to as an LV image.

A nonvolatile memory 56 is, for example, an EEPROM, which is electrically erasable and recordable. Constants and programs, for example, for operating the system control unit 50 are stored in the nonvolatile memory 56. In this context, "programs" may refer to programs for executing various flowcharts that will be described later.

The system control unit 50 is at least one processor or circuit that controls the entire digital camera 100. The system control unit 50 realizes, by executing the programs stored in the nonvolatile memory 56, the procedures of the flowcharts that will be described later. A RAM is used as the system memory 52, for example. Constants and variables for operating the system control unit 50, and the programs read out from the nonvolatile memory 56 are expanded in the system memory 52. The system control unit 50 controls the memory 32, the D/A converter 13, the display unit 28, and the like, so as to perform display control.

A system timer 53 is a timer circuit for measuring time periods for various types of controls and the time of an integrated clock. A mode switching button 60, a shutter button 61, and the operation unit 70 are operation members for inputting various instructions to operate the system control unit 50.

The mode switching button 60 switches the operation mode of the system control unit 50 to any of a still image shooting mode, a moving image recording mode, and a reproduction mode. The still image shooting mode includes an automatic shooting mode, an automatic scene determination mode, a manual mode, various types of scene modes in which different settings are configured for individual shooting scenes, a program AE mode, a custom mode, and the like. Using the mode switching button 60, the user can directly switch the mode to any of these modes. Alternatively, it is also possible to switch, using the mode switching button 60, to a menu button and then to switch, using another operation member, to any of these modes included in the menu button. Similarly, the moving image recording mode may also include a plurality of modes.

The shutter button 61 includes a first shutter switch 62 and a second shutter switch 64. While the shutter button 61 provided on the digital camera 100 is being operated, that is, pressed half-way (the shooting preparation instruction), the first shutter switch 62 is turned on and generates a first shutter switch signal SW1. With the first shutter switch signal SW1, the AF (Automatic Focus) processing, the AE (Automatic Exposure) processing, the AWB (Automatic White Balance) processing, the EF (flash pre-emission) processing and the like are started. When the operation of the shutter button 61 is completed, that is, the shutter button 61 is pressed fully (the shooting instruction), the second shutter switch 64 is turned on and generates a second shutter switch signal SW2. Upon receiving the second shutter switch signal SW2, the system control unit 50 starts a series of shooting processing from reading out the signal from the image capturing unit 22 to writing of image data to the recording medium 200.

By selecting various functional icons displayed on the display unit 28, appropriate functions for each situation are assigned to the operation members of the operation unit 70, and the operation members thus act as various function buttons. Examples of these function buttons include an end button, a back button, an image scrolling button, a jump button, a narrow-down button, and an attribute change button. For example, a menu screen that enables various settings to be made is displayed on the display unit 28 by pressing the menu button. The user can perform various settings intuitively by using the menu screen, which is displayed in the display unit 28, four-direction (up, down, left, right) buttons and a SET button.

The controller wheel 73, which is a rotatable operation member included in the operation unit 70, is used together with the direction buttons when a selection item is specified. When the controller wheel 73 is turned, an electrical pulse signal is generated in accordance with the amount of rotation, and the system control unit 50 controls each unit of the digital camera 100 based on the pulse signal. The angle by which the controller wheel 73 has been turned and how many times it has been turned can be determined by the pulse signal. It should be noted that the controller wheel 73 can be any operating member as long as it is an operating member whose rotation can be detected. For example, it can be a dial operating member in which the controller wheel 73 per se is rotated to generate the pulse signal in accordance with a turning operation by the user. Further, it can be a device (a so-called touch wheel) that is an operation member constituted by a touch sensor, and detects an operation such as the revolution of the user's finger on the controller wheel 73 without the controller wheel 73 itself being rotated.

A power control unit 80 is constituted by, for example, a battery detection circuit, a DC-DC converter, a switch circuit for changing over the block to be supplied with power, and detects whether or not a battery has been inserted, the type of the battery, and the residual capacity thereof. Further, the power control unit 80 controls the DC-DC converter in accordance with the detection results and an instruction of the system control unit 50, and supplies a necessary voltage for a necessary length of time to each of the units including the recording medium 200. A power supply unit 30 is constituted by a primary battery such as an alkaline battery or a lithium battery, a secondary battery such as a NiCd battery, a NiMH battery, or a lithium-ion battery, an AC adapter, or the like.

A memory medium I/F 18 is an interface for connection to the memory medium 200, such as a memory card or a hard disk. The memory medium 200 is a memory medium such as a memory card for storing a captured image, and is constituted by a semiconductor memory, a magnetic disk, or the like. A communication unit 54 performs transmitting/receiving video and sound signals to/from an external device connected wirelessly or via a wired cable. The communication unit 54 is also connectable to a wireless LAN (Local Area Network) and the Internet. The communication unit 54 can transmit an image (including a through image) captured by the image capturing unit 22 and an image stored in the memory medium 200 to an external device, and receive image data and other various kinds of information from an external device.

An attitude detection unit 55 detects the attitude of the digital camera 100 with respect to the gravity direction. In this case, based on the orientation detected by the attitude detection unit 55, it is possible to determine whether an image captured by the image capturing unit 22 has been shot by setting the digital camera 100 in the landscape or portrait direction. The system control unit 50 can add information about the attitude detected by the attitude detection unit 55 to the image file of an image captured by the image capturing unit 22, and rotate and store the captured image. An acceleration sensor, a gyro sensor and the like may be used as the attitude detection unit 55.

An eye-on detection unit 57 detects the approach (eye-on) of an eye (an object). The system control unit 50 performs switching to display/not display an image on the backside display panel 28*a* and the electronic viewfinder 28*b* based on the state that has been detected by the eye-on detection unit 57. That is, if the eye-on detection unit 57 has detected eye-on, the display destination is the electronic viewfinder 28*b*, and if the eye-on detection unit 57 has not detected eye-on, the display destination is the backside display panel 28*a*.

Included in the operation unit 70 is also a touch panel (touch screen) 70*a* that is capable of detecting a touch operation (touched position) on the backside display panel 28*a*. The touch panel 70*a* and the backside display panel 28*a* can be constructed as a single integrated unit. For example, the touch panel 70*a* is configured such that the transmittance of light is set so as to not interfere with the display presented by the backside display panel 28*a*, and it is incorporated inside the display screen of the backside display panel 28*a* (in-cell type). In addition, input coordinates on the touch panel 70*a* and display coordinates on the backside display panel 28*a* are correlated. As a result, a GUI (graphical user interface) can be configured that makes it possible for the user to directly manipulate the screen displayed on the backside display panel 28*a*. The system control unit 50 is capable of detecting the following user operations and conditions performed by contacting the touch panel 70*a*.

Detection of newly touching of the touch panel 70*a* by a finger or pen which has not been in contact with the touch panel 70*a*, that is a start of the touch (referred to as "touch-down" below).

Detection of a state in which the touch panel 70*a* is in contact with a finger or pen (referred to as "touch-on" below).

Detection of movement of a finger or pen while in contact with the touch panel 70*a* (referred to as "touch-move" below).

Detection of lifting of a finger or pen that has been in contact with the touch panel 70*a*, that is an end of the touch (referred to as "touch-up" below).

Detection of a state in which the touch panel 70*a* is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 70*a* is being touched by the finger or pen are communicated to the system control unit 50 through an internal bus and, based on the information thus communicated, the system control unit 50 determines what kind of operation was performed on the touch panel 70*a*. As for "touch-move", for example, the system control unit 50 can determine the direction of movement of the finger or pen, in terms of the vertical and horizontal components, which is moved on the touch panel 70*a*, based on a change in the coordinate position. Further, the system control unit 50 can determine that a stroke has been performed if it detects a touch-up after a touch-move over a predetermined distance on the touch panel 70*a*.

An operation to swiftly perform a stroke is referred to as a "flick". A flick is an operation in which a finger is touched against the touch panel, swiftly moved a certain distance, and then lifted away. In other words, a flick is an operation in which a finger is swiftly flicked across the touch panel 70*a*. If a touch-move with a predetermined distance or longer and a predetermined speed or higher is detected, and then a touch-up is detected, it can be determined that a flick has been performed. Also, if a touch-move with a predetermined distance or longer and a speed less than the predetermined speed is detected, it is assumed that a drag has been performed. Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 70a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or pen to the touch panel, and any method may be employed.

The digital camera 100 can switch at least between a reproduction mode for reproducing an image and a shooting mode for performing shooting, and includes an automatic shooting mode, a manual mode, and a plurality of shooting modes for specific scenes as the shooting mode. The automatic shooting mode is a mode in which various parameters of the camera are automatically determined by a program incorporated in the digital camera 100 based on the measured exposure value. The manual mode is a mode in which the user can freely change the various parameters of the camera. The shooting modes for specific scenes are shooting modes in which the various parameters are determined, for each shooting scene, by combining a shutter speed, an F-number, a stroboscope light-emitting state, an ISO speed setting, a white balance (WB) setting, and the like that are appropriate for the shooting scene. The digital camera 100 includes the following shooting modes for specific scenes (1) to (3), for example. But, the shooting modes for specific scenes are not limited thereto. A photographer can set the digital camera 100 to a desired shooting mode from a shooting mode selection menu, and can perform shooting.

(1) Portrait shooting mode: a mode specializing in portrait photography in which the background is blurred so as to highlight a person.
(2) Flower shooting mode: a mode in which a macro mode is set and the chroma saturation is set to a relatively high value.
(3) Sport shooting mode: a shooting mode specializing in shooting a swiftly moving object.

The digital camera 100 described above can perform shooting using a central one point AF mode, a face AF, and a pupil AF. The central one point AF mode is a mode in which AF is performed on a point at the center of the shooting screen. The face AF is a mode in which AF is performed on a face inside the shooting screen that has been detected by a face detection function. A pupil AF is a mode in which AF is performed on a pupil included in the face inside the shooting screen detected by an organ detection function, which is a type of the face detection function.

The face detection function will be described. The system control unit 50 functions as a detection unit that can detect a face and an organ (eye, nose, mouth, ear, and the like) of the face from an image. The system control unit 50 transfers image data of the face to be detected to the image processing unit 24. The image processing unit 24, under the control of the system control unit 50, applies a horizontal direction bandpass filter on the image data. Also, image processing unit 24, under the control of the system control unit 50, applies a vertical direction bandpass filter on the image data. As a result of applying the horizontal and vertical direction bandpass filters, edge components can be detected from the image data.

Thereafter, the system control unit 50 performs pattern matching with respect to the detected edge components, and extracts candidate groups for eyes, a nose, a mouth and ears. The system control unit 50 then judges parts that satisfy a preset condition (e.g., distance between or inclination of two eyes, etc.) out of the extracted candidate group for eyes to be a pair of eyes, and narrows the candidate groups down to only those having a pair of eyes as the candidate group for eyes. The system control unit 50 then detects faces by associating the candidate group for eyes that was narrowed down with other parts (organs such as nose, mouth, ears) forming the faces corresponding thereto, and passing the resultant data through a preset non-face conditional filter. The system control unit 50 outputs the number of detected faces and the face information including positions, sizes, and orientations of the faces, and positions and sizes of included organs (eye, nose, mouth, and ear), according to the face detection result, and ends the processing. At this time, the system control unit 50 stores the feature amounts such as the number of faces, in the system memory 52. The region once detected as a face is continuously detected, for a predetermined period (about one second), as a face if the conditions such as contrast, color, and size match. Accordingly, even if an organ of the face is temporarily undetected due to an object facing backward, closing an eye, or the like, the face can be continuously detected.

The system control unit 50 determines the eye extracted from the face that has been detected using the above-described face detection function as a detected eye (pupil), and outputs pupil information as a pupil detection result. The pupil information includes the position of the eye in the image, the position, the size, and the like of the eye in the face, and a pupil region based on the position and the size of the eye, for example. The pupil detection is a type of organ detection that detects an element (part) of the face.

As described above, information of a specific object such as a face or a pupil can be detected by performing image analysis on the image data to be live view-displayed or reproduction-displayed in order to extract feature amounts of the image data.

Note that face AE, face FE, and face WB can be performed at the same time as the face AF. The face AE is to optimize the exposure of the overall screen in accordance with the brightness of the detected face. The face FE is to modulate light of a flash placing the detected face at the center. The face WB is to optimize the WB of the overall screen in accordance with the color of the detected face.

Furthermore, the system control unit 50 can detect, using the image processing unit 24, a body (body other than a face and organs of a person) that is assumed to be a main object based on conditions such as a color, contrast, and a motion vector.

Also, in the digital camera 100, one AF mode can be set according to a user operation from a plurality of AF modes, as the operation mode of autofocus (AF) at shooting. The AF mode is set based on a user operation on an AF mode setting screen that is displayed when a menu item for setting the AF mode is selected on the setting menu screen. A plurality of AF modes, for respective methods for determining the position on which AF is performed, are provided. In the present embodiment, one of a one point AF mode and a tracking priority mode can be set as the AF mode.

The one point AF mode is an AF mode in which an AF frame that represents a focus adjustment position is set at the center of the shooting range or at a point designated by the user. In the one point AF mode, the AF frame does not move even if a change occurs in the object, and AF is performed based on the information (contrast value or defocus amount for phase difference AF) obtained from the region enclosed by the AF frame regardless of whether or not an object such as a face has been detected.

In the tracking priority mode, when the user does not designate tracking (tracking stand-by state, tracking cancelled state), an object that the digital camera 100 has automatically determined as the main object is the AF target (focus adjustment position). If a human face is detected, a pupil or a face of the detected person is prioritized to be the main object and is set as the AF target. If no human face is detected, the digital camera 100 automatically determines a main object as the AF target in accordance with predetermined condition, which is a moving body, an object having a high contrast value, an object closest to the center, or the like. Also, after the user has designated tracking, the object designated in the LV image is continuously tracked, and even if the position of the object being tracked changes in the shooting range, the object being tracked is the AF target. For example, when the user designates a pupil or a face of a person A as an object to be tracked (being tracked), even if the person A moves in the LV image, the pupil or the face of the person A is continuously tracked, and is set as the AF target.

Also, an object other than a person can be set as the tracking target (body tracking), and an object is continuously tracked even if the same object moves in the LV image, using the color, contrast, shape, or the like at the position designated to be tracked as conditions, and is set as the AF target. That is, the tracking priority mode is an AF mode in which the AF position can be determined by performing tracking. Note that the AF mode is not limited to the one point AF mode and the tracking priority mode. For example, the AF mode may include an AF mode ("zone AF") in which tracking is performed in a limited region designated by the user, and the like. The set AF mode is stored in the nonvolatile memory 56, and in the shooting mode processing, the stored set AF mode is read out to the system memory 52.

Figure 3A:
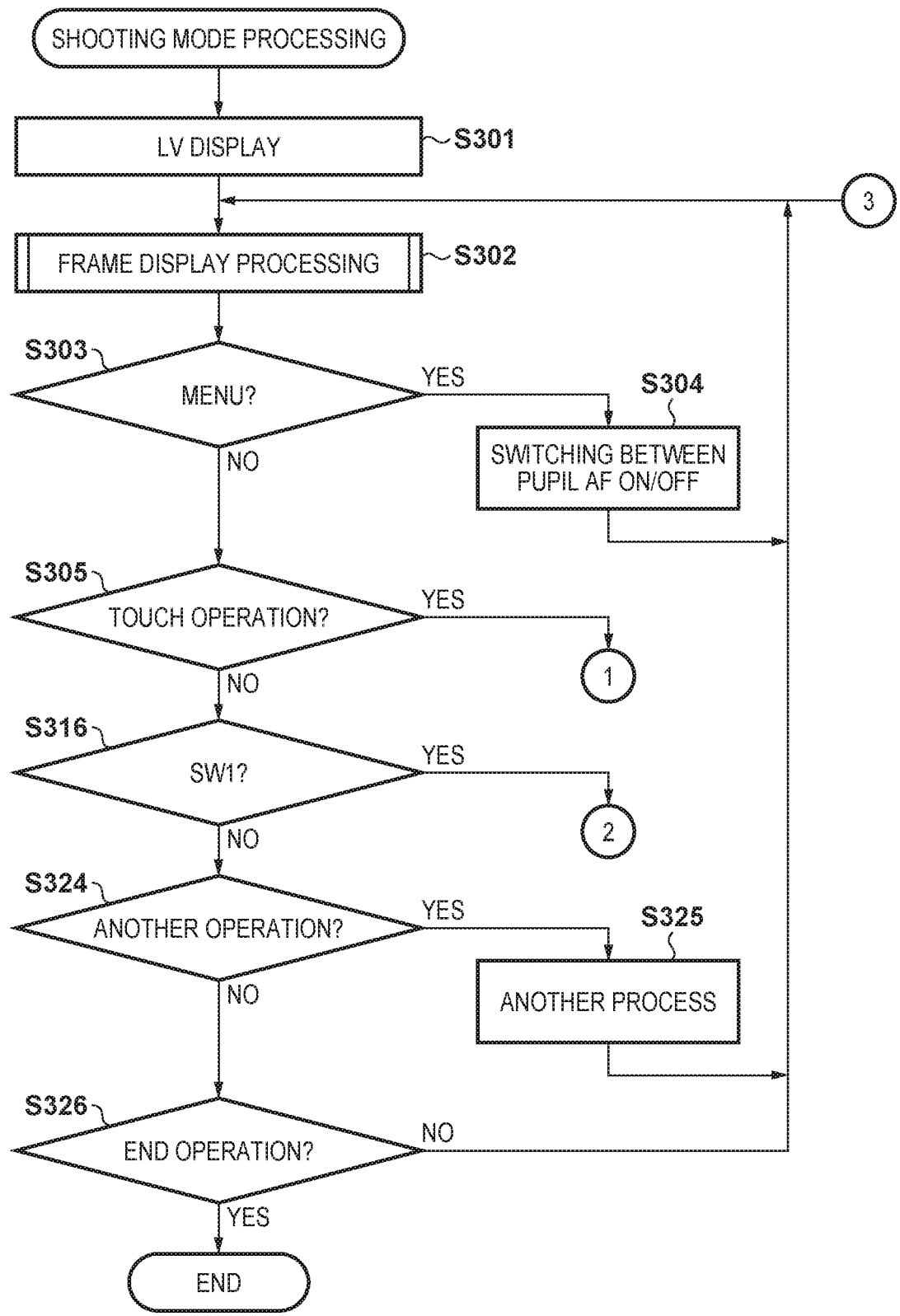
FIGS. 3A to 3C are flowcharts illustrating shooting mode processing in the embodiment.
Figure 3B:
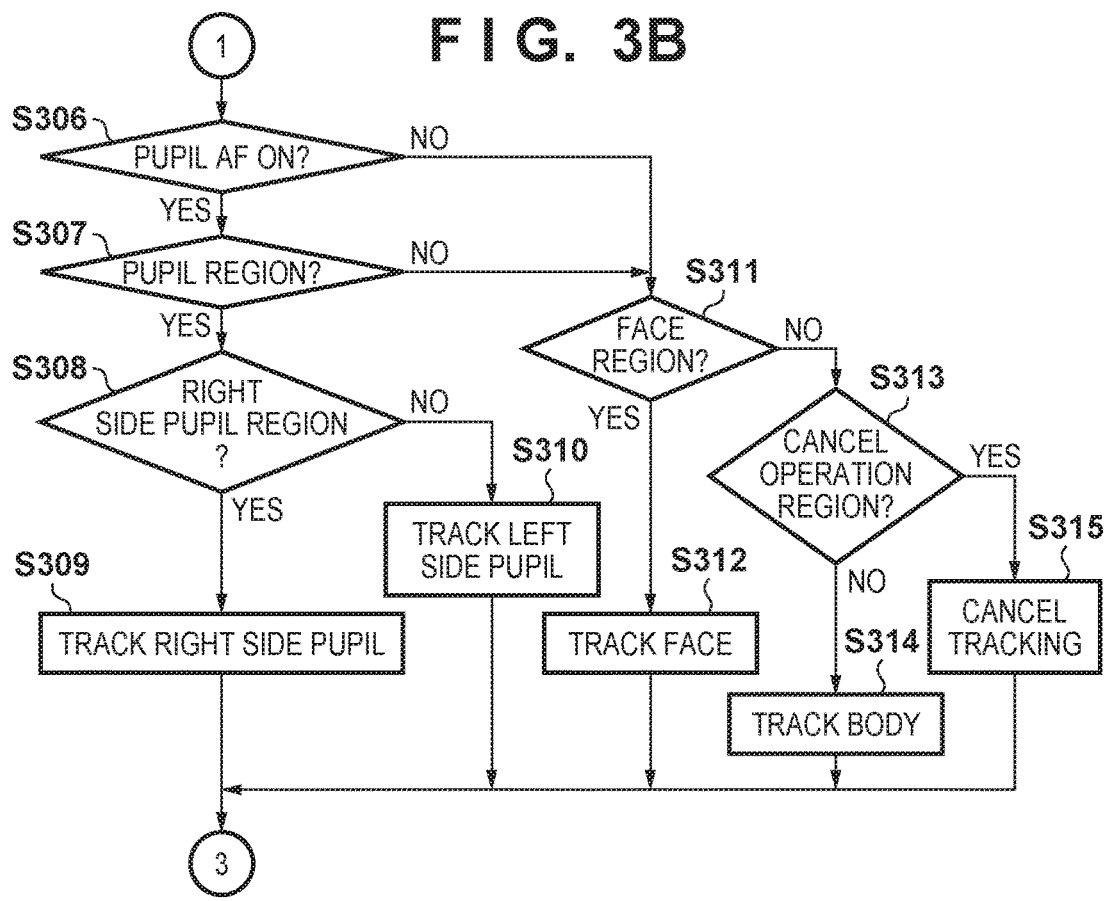
Figure 3C:
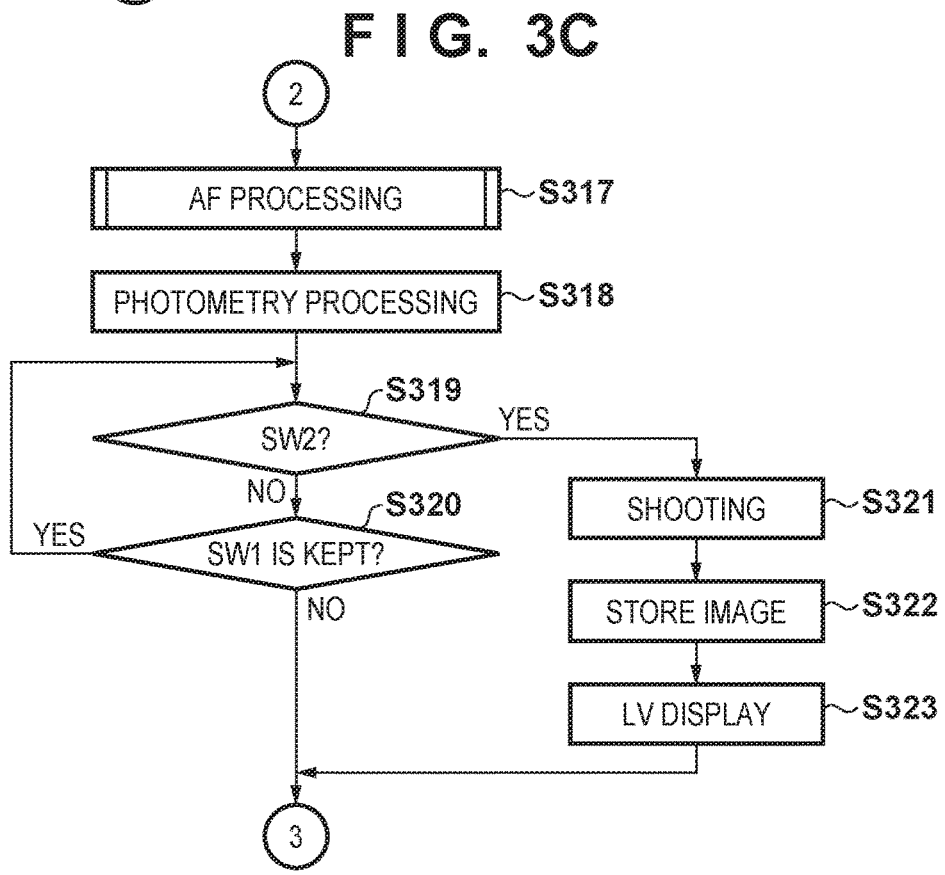

FIGS. 3A to 3C are flowcharts relating to the shooting mode processing of the digital camera 100 according to the present embodiment. The processing in FIGS. 3A to 3C, and the processing in FIGS. 4A to 4C and FIGS. 5A and 5B, which will be described later, are realized by the system control unit 50 executing programs stored in the nonvolatile memory 56 using the system memory 52 as a work memory. When the digital camera 100 is started in a live view shooting mode, the processing in FIGS. 3A and 3B is started. Note that the processing in FIGS. 3A to 3C is processing when the AF mode is set to the tracking priority mode. Description of the processing when the one point AF mode is set will be omitted.

Note that, in the tracking priority mode, a face and organs of the face are detected from an image, and the detected face and organs are the candidates to be designated as the AF target (tracking target) by the user operation (touch operation in the present embodiment). Also, a plurality of operation modes are provided in which the AF target that can be designated by such a touch operation is different, and the user can set one of the operation modes in the menu screen. In the following, an image capture apparatus will be described in which the organ of a face to be detected from an image is assumed to be an eye (pupil), and "pupil AF ON" (first operation mode) in which the face and the pupil can be designated as the AF target, and "pupil AF OFF" (second operation mode) in which the face can be designated as the AF target, but the pupil cannot be designated as the AF target can be set as the plurality of operation modes in which the AF target that can be designated is different.

In step S301 (FIG. 3A), the system control unit 50, after performing shooting mode initialization processing, displays a video acquired by the image capture unit 22 in the display unit 28 as a live view (LV display). The display destination at this time when the display destination switching is set to "automatic" is the backside display panel 28a if eye-on is not detected, and the electronic viewfinder 28b if eye-on is detected. Also, the display destination when the display destination switching is set to "manual" is the backside display panel 28a if the display destination is set to the backside display panel 28a, and the electronic viewfinder 28b if the display destination is set to the electronic viewfinder 28b. Here, the shooting mode initialization processing is processing in which parameters including flags and control variables and the like, set values, and the set mode are read out from the nonvolatile memory 56, and the like. Also, the state of the memory medium 200 is confirmed, and if an abnormality or the like is found, a warning or the like is displayed so as to be superimposed on the live view.

In step S302, the system control unit 50 performs frame display processing for displaying frames indicating that a pupil, a face, and a body are being detected, or frames indicating that these objects are being tracked. The frame display processing will be described using FIGS. 4A to 4C.

In step S303, the system control unit 50 determines whether or not a MENU button included in the operation unit 70 has been pressed. If it has determined that the MENU button has been pressed, the processing advances to step S304, and if not, the processing advances to step S305. In step S304, the system control unit 50 displays the menu screen. The menu screen includes an item to set the pupil AF, and if the user has selected the item to set the pupil AF, a setting screen of the pupil AF is displayed in the display unit 28. In the setting screen of the pupil AF, options of "ON" and "OFF" are displayed as the setting candidates, and the user can set one of ON or OFF of the pupil AF by selecting the corresponding option. When the setting of ON/OFF of the pupil AF is changed by the user operation, the changed set value is set and stored in the nonvolatile memory 56.

In step S305, the system control unit 50 determines whether or not a touch operation (position designation operation) on the touch panel 70a has been detected. If the touch operation has been detected, the processing advances to step S306 (FIG. 3B), and if not, the processing advances to step S316 (FIG. 3A). In steps S306 to S315, processing to set the tracking target is performed based on the ON/OFF of the pupil AF, and the position on the display screen designated by the touch operation. Note that the position designation operation by the touch operation to be detected here is touch-down if the display destination is the backside display panel 28a, and is touch-up if the display destination is the electronic viewfinder 28b. It is because that while display data is output to the electronic viewfinder 28b, the user generally cannot view the touched position on the touch panel, and as a result of the touch position being determined by touch-up after touch-down, the target position can be easily determined.

In step S306 (FIG. 3B), the system control unit 50 determines whether or not the pupil AF is set (pupil AF ON or pupil AF OFF). If the pupil AF is turned on, the processing advances to step S307, and if not, the processing advances to step S311. In step S307, the system control unit 50 determines whether or not a pupil has been detected in the live view image, and whether or not the designated position (hereinafter, also referred to as a touch operation position) when the touch operation was detected in step S305 is the position of the detected pupil (inside a pupil region). If the position of the touch operation is inside the pupil region, the processing advances to step S308, and if not, the processing advances to step S311. Note that, in step S307, in the operation mode in which pupil AF is turned on, the pupil can be designated distinguishing between a right side pupil and a left side pupil of the object.

Note that, when the display destination is the backside display panel 28a, if a touch-down is performed inside the region corresponding to the detected pupil in the live view displayed in the backside display panel 28a, the position of the touch operation is determined to be inside the detected pupil region. Also, if the display destination is the electronic viewfinder 28b, a cursor indicating the designated position is moved by touch-move in the live view displayed in the electronic viewfinder 28b, and the position of the cursor when touch-up is performed is the position of the touch operation. Accordingly, if touch-up is performed in a state in which the cursor has been moved to a region corresponding to the detected pupil in the live view displayed in the electronic viewfinder 28b, the position of the touch operation is determined to be inside the detected pupil region.

In step S308, the system control unit 50 determines whether or not the designated position determined in step S307 is inside the selection region (inside a later-described upper right region 703) of a right side pupil (left eye of the object), viewed from the user, of the object in live view. If the right side pupil is designated, the processing advances to step S309. If the right side pupil is not designated, that is, if the designated position determined in step S307 is inside the selection region (inside a later-described upper left region 702) of a left side pupil (right eye of the object), viewed from the user, of the object in live view, the processing advances to step S310.

In step S309, the system control unit 50 tracks the right side pupil (left eye of the detected face) of the face detected in the designated position as the tracking target. In step S310, the system control unit 50 tracks the left side pupil (right eye of the detected face) of the face detected in the designated position as the tracking target.

On the other hand, if the designated position is not the pupil region in step S307, in step S311, the system control unit 50 determines whether or not the position designated by the touch operation is the position of the detected face (inside a face region). If the position of the face (if inside a later-described face region 701, 701a, or 701b) is designated, the processing advances to step S312, and if not, the processing advances to step S313. In step S312, the system control unit 50 tracks the face detected at the position designated by the touch operation as the tracking target.

The processing in steps S307, S308, and S311 will be described in detail using FIGS. 7A to 7F. FIGS. 7A to 7F are schematic diagrams showing touch reaction regions for selecting a face or a pupil in the digital camera 100 when the display destination is the backside display panel 28a, and are diagrams in which a portion of one face detected in live view is extracted and illustrated. In actuality, a region outside the face or another face are included in a live view image, but these are omitted in the description of FIGS. 7A to 7F.

Figure 7A:
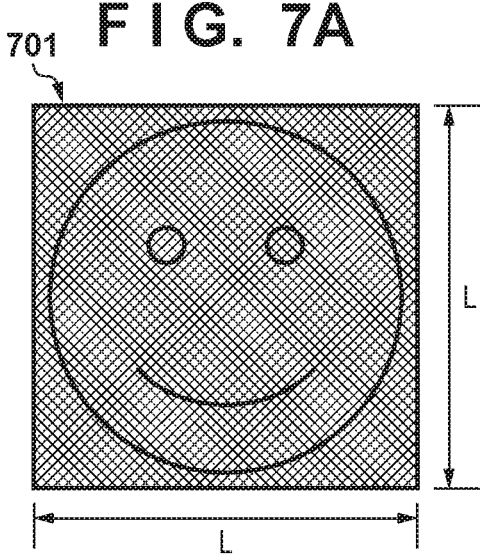
FIGS. 7A to 7F are schematic diagrams illustrating a touch reaction region in the embodiment.

FIG. 7A is a diagram illustrating the touch reaction region in a state in which only a face is detected. The pupil is assumed to be not detected due to the eyed being closed or the like. Here, the user can select only the face, and the face region 701 that is to be a touch reaction region is set as a square region (height and width are length L) that covers the entirety of the face. In this way, the system control unit 50, upon a face being detected in the image, sets the face region corresponding to the region of the face on the display screen, and associates the detected face with the face region. Accordingly, if a touch operation by the user on the face region 701 is detected in this state, the face is selected.

Figure 7B:
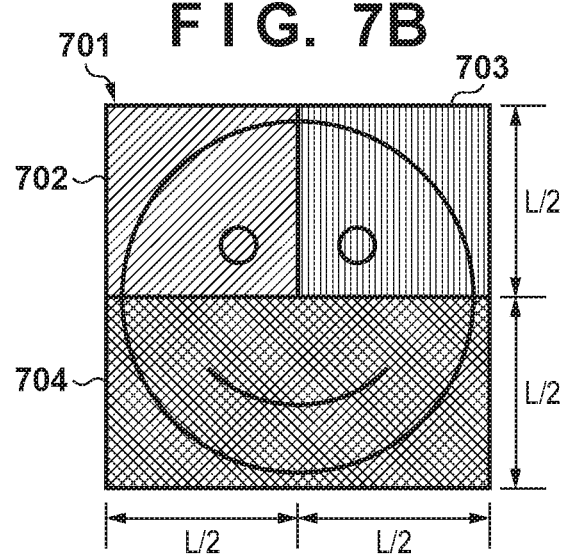

If a predetermined organ (pupil in the present embodiment) is detected from the detected face, the system control unit 50 divides the set face region into a plurality of regions, and associates the regions with the face and the predetermined organ. FIG. 7B shows a state in which a face and left and right eyes are detected. Here, the user can select from three objects, namely, the face, the right side pupil, and left side pupil, viewed facing the object. Therefore, the face region 701 is divided into three regions, as shown in FIG. 7B. An upper left region 702, which is an upper left touch reaction region, is set as the selection region of the left side pupil, an upper right region 703, which is an upper right touch reaction region, is set as the selection region of the right side pupil, and a lower region 704, which is a lower half touch reaction region, is set as the selection region of the face. Note that, in the present embodiment, the direction from the mouth and the nose to the pupils relative to the face is the upward direction.

Note that the face region is divided in accordance with a predetermined rule regardless of the size of an organ when detected. For example, the face region is divided such that, even if the sizes of the face region and the regions of organs are changed according to the sizes of the detected face and organs, the area ratio and the positional relationship between the face region and the plurality of regions are maintained. A specific example will be illustrated. In the present embodiment, the heights and the widths of the upper left region 702, the upper right region 703, and the lower region 704 are at certain ratios relative to the size of the face region 701 regardless of the size (ratio) of the pupil relative to the detected face, and are set as follows. That is, the heights of the upper left region 702, the upper right region 703, and the lower region 704 are the same (length L/2, that is, half the height of the face region 701). Also, the widths of the upper left region 702 and the upper right region 703 are the same length (length L/2, that is, half the width of the face region 701). The width of the lower region 704 is twice the width of the upper left region 702 or the upper right region 703 (length L). The face region 701 is equally divided in the vertical and horizontal directions into four portions, and the upper left portion, the upper right portion, and the lower two portions are respectively set as the touch reaction regions corresponding to the left side pupil, the right side pupil, and the face. The heights of the reaction regions of the face and the pupils are made the same, and as a result, the user can select the face or one of the pupils with the same operational feeling. Also, the widths of the reaction regions of the left and right pupils are made the same, and as a result, even if one of the pupils is detected to be smaller than the other pupil due to the face facing obliquely, the left or right pupil can be selected with the same operational feeling.

Figure 7C:
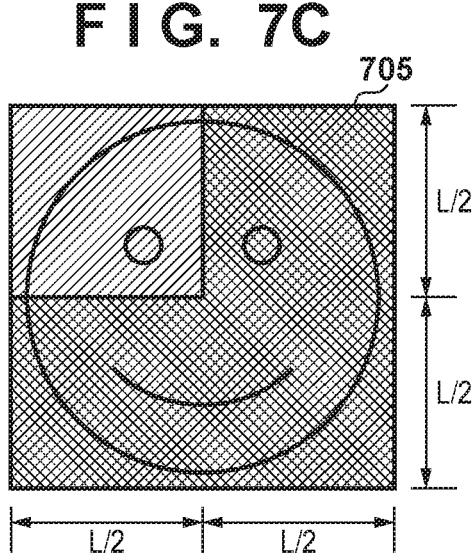

FIG. 7C shows a state in which a face and only one pupil (left side pupil, here) are detected. At this time, the upper right region 703, which is the upper right touch reaction region in FIG. 7B, is combined with the lower region 704, which is the lower half touch reaction region, and is set as a face touch reaction region 705. That is, if the region of the undetected pupil is touched by the user, the face is selected.

In the pupil AF, if the pupil desired to be brought into focus is not detected, there are use cases where the standing position and the orientation of the photographer or the object are adjusted such that the pupil can be detected, but it is troublesome because it is possible that another object is detected as the main object during this action. Therefore, in the present embodiment, if the undetected pupil is touched, the face is tracked. According to this control, the main object can be prevented from changing from the current object to another object. Accordingly, the photographer can easily bring the desired pupil into focus by moving him/herself or the object, even if the targeted pupil is not detected.

Figure 7D:
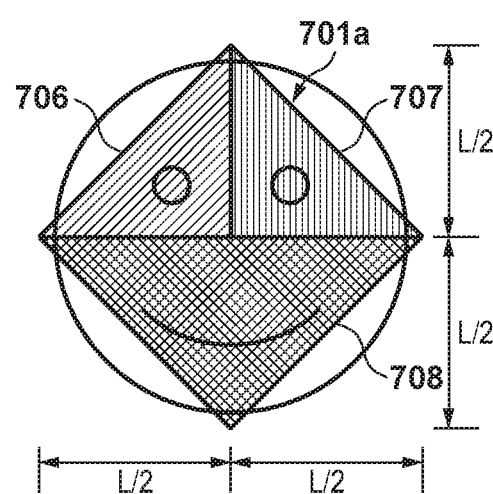
Figure 7E:
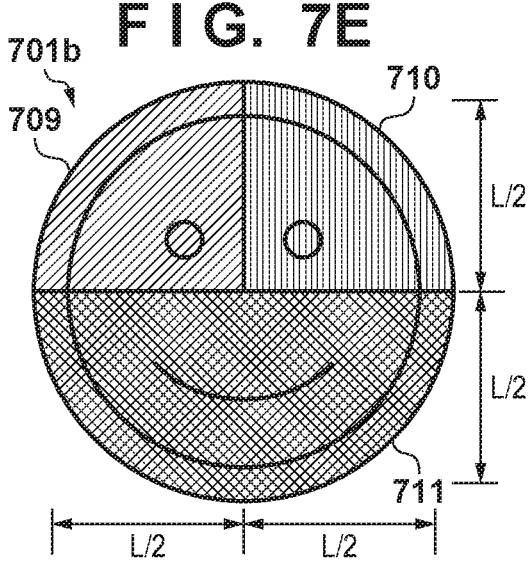
Figure 7F:
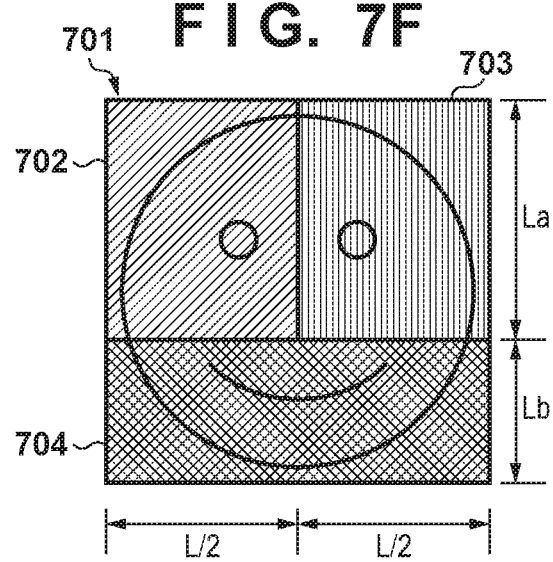

Note that, in FIGS. 7A to 7C, the face region 701 is a square, but another shape such as a rectangle, a rhombus, a circle, or an ellipse may be adopted according to the object to be detected. For example, because the human face is actually close to a rhombus or a circle, a rhombus face region 701a as in FIG. 7D, or a circle face region 701b as in FIG. 7E may be set as the touch reaction region. In the case of FIGS. 7D and 7E, regions 706 and 709, which are the upper left touch reaction regions, may be set as the selection regions of the left side pupil, regions 707 and 710, which are the upper right touch reaction regions, may be set as the selection regions of the right side pupil, and regions 708 and 711, which are the lower half touch reaction regions, may be set as the selection regions of the face. Also, in FIGS. 7A to 7C, the widths of the upper left region 702 and the upper right region 703 are the same, and the heights of the upper left region 702, the upper right region 703, and the lower region 704 are the same, but only one of these may be implemented. For example, as shown in FIG. 7F, the face region 701 may be divided such that the sizes (height) in the vertical direction of the upper left region 702 and upper right region 703 and the lower region 704 are respectively La and Lb (La≠Lb, La+Lb=L).

Also, in FIGS. 7A to 7C, a case where the widths of the upper left region 702 and the upper right region 703 are the same has been described, but the widths may be changed according to the orientation of the face. An example in which the widths of the upper left region 702 and the upper right region 703 are changed according to the orientation of the face will be described using FIGS. 8A to 8E.

Figure 8A:
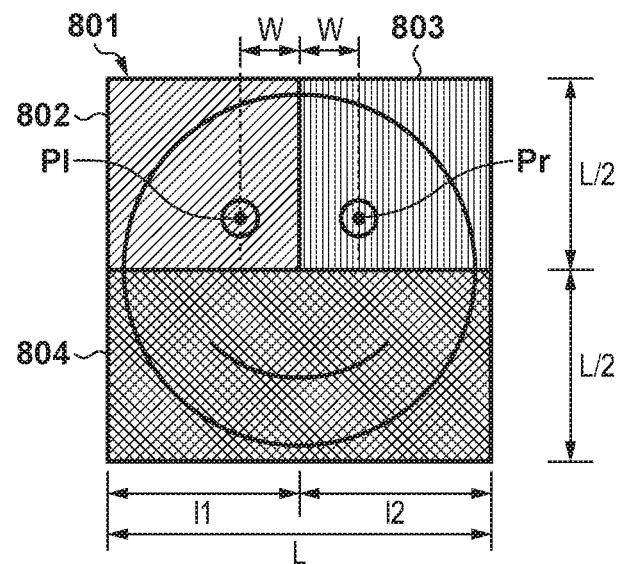
FIGS. 8A to 8E are schematic diagrams illustrating a touch reaction region in the embodiment.

FIG. 8A shows a state in which left and right eyes are both detected. Here, the user can select three things about the object, namely the face and the right side pupil and left side pupil viewed facing the object to be shot. Therefore, the face region 801 is divided into three regions, as in FIG. 8A, and the upper left region 802, which is the upper left touch reaction region, is set as the selection region of the left side pupil, the upper right region 803, which is the upper right touch reaction region, is set as the selection region of the right side pupil, and the lower region 804, which is the lower half touch reaction region, is set as the selection region of the face.

Note that the face region is divided in accordance with a predetermined rule. The heights of the upper left region 802, the upper right region 803, and the lower region 804 are fixed ratios of the size of the face region 801 regardless of the size (ratio) of the pupil relative to the detected face, and are set as follows. That is, the heights of the upper left region 802, the upper right region 803, and the lower region 804 are the same (length L/2, that is, half the height of the face region 801). In this way, the user can select the face or the pupil with the same feeling.

The widths of the upper left region 802 and the upper right region 803 are determined with reference to the mid-point of the detection positions of the left side pupil and the right side pupil, which is different from the condition described in FIG. 7A. That is, the widths of the upper left region 802 and the upper right region 803 are determined such that the mid-point of the detection positions of the left side pupil and the right side pupil is the boundary between the upper left region 802 and the upper right region 803. The detection position (central coordinates of the detected pupil) of the left side pupil is defined as Pl, and the detection position (central coordinates of the detected pupil) of the right side pupil is defined as Pr. The distance W from each of the pupils to the mid-point of the detection positions of the pupils can be obtained as follows from the horizontal position Pl(x) of Pl and the horizontal position Pr(x) of Pr.

$$W=|Pr(x)-Pl(x)|/2$$

Then, the width l1 of the upper left region 802 and the width l2 of the upper right region 803 are calculated (determined) based on the positions Pl(x) and Pr(x) of the pupils and the distance W. That is, when Pf(x) is defined as the X coordinate of the upper left vertex of the face region 801, $$l1 = Pl(x) - Pf(x) + W$$
$$= Pl(x) - Pf(x) + |Pr(x) - Pl(x)|/2$$
$$l2 = L - l1.$$

Also, the coordinate of the boundary between the upper left region 802 and the upper right region 803 is, $$Pl(x)+W=Pr(x)-W.$$

FIG. 8A shows an example of the full face, the midpoint of the right side pupil and the left side pupil is the midpoint of the face region, and l1=l2=L/2. The width of the lower region 804 is the sum of the width l1 of the upper left region 802 and the width l2 of the upper right region 803.

Figure 8B:
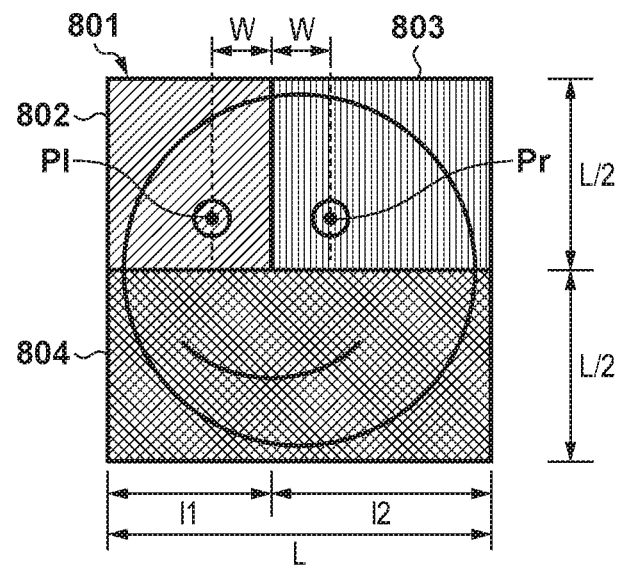
Figure 8C:
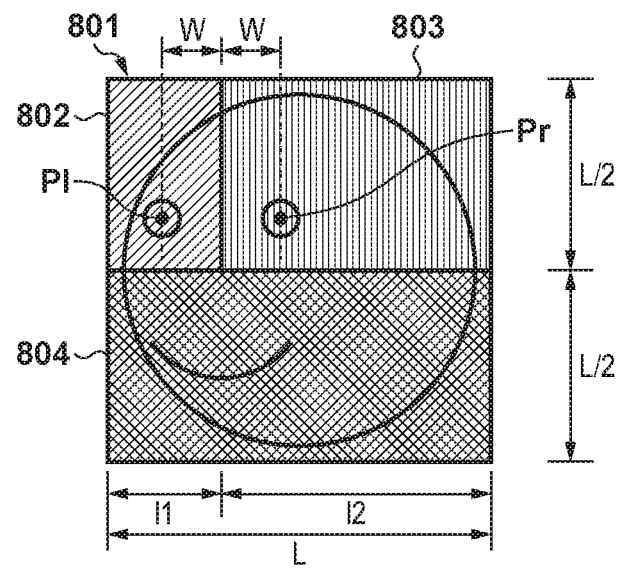

FIGS. 8B and 8C show a manner in which the face is more inclined on the left side relative to the digital camera 100 than the state shown in FIG. 8A. The width l1 of the upper left region 802 and the width l2 of the upper right region 803 can be calculated from the above-described conditions. Accordingly, in FIG. 8B, which shows an example of the inclined face, the width l1 of the upper left region 802 relative to the face region is narrower than that in FIG. 8A, which shows an example of the full face, and the width l2 of the upper right region 803 is wider. In FIG. 8C, which is an example of the face further inclined than that in FIG. 8B, the width l1 of the upper left region 802 relative to the face region is narrower than that in FIG. 8B, and the width l2 of the upper right region 803 is wider. In this way, the user can intuitively select the left or right eye. In particular, if the widths of the upper left region 802 and the upper right region 803 are set to be equal, when the face is inclined as in FIG. 8C, if the user touches the detection position Pr of the right side pupil, it is possible that the left side pupil will be selected instead of the right side pupil. In contrast, when the widths of the upper left region 802 and the upper right region 803 are set as shown in FIG. 8C, even if the face is inclined as shown in FIG. 8C, if the user touches the detection position Pr of the right side pupil, the right side pupil will be selected as intended by the user.

Figure 8D:
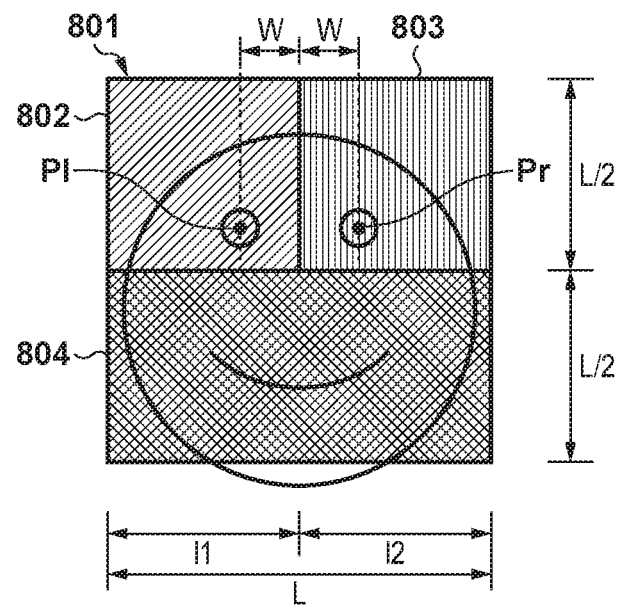

FIG. 8D shows a manner in which the face is inclined upward relative to that shown in FIG. 8A. In this case, as a result of facing upward, the center of the detected face region may shift from the central position of the face. For example, when the face faces upward, the central position of the face shifts upward relative to the center of the face region. Therefore, the central position of the face region may be appropriately set again, as shown in FIG. 8D. In this case as well, the heights of the upper region and the lower region are the same.

Figure 8E:
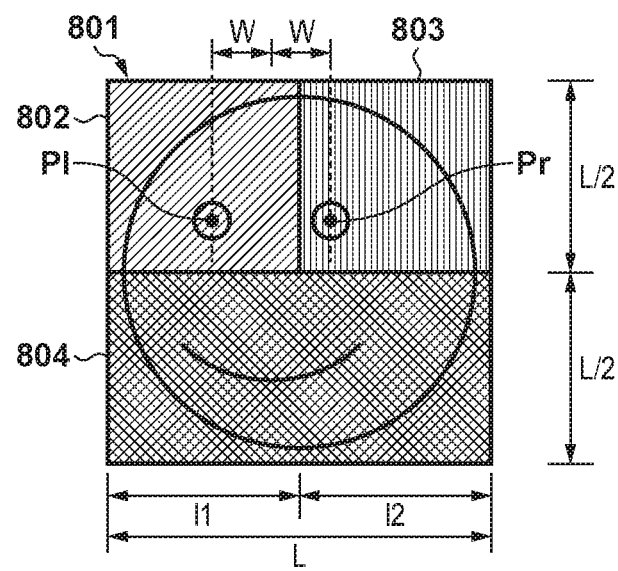

Note that, in the cases described in FIGS. 8A to 8C, the width l1 of the upper left region 802 and the width l2 of the upper right region 803 are always adjusted (adjusted according to the inclination of the face) based on the positions of the pupils and the distance W, but there is no limitation to this. The configuration may be such that whether or not the boundary between the upper left region 802 and the upper right region 803 is adjusted is determined according to whether or not a predetermined condition indicating that the inclination of the detected face is large is satisfied. For example, if the inclination of the face is a predetermined amount or less, this adjustment is not performed, and l1=l2=L/2 may be set. For example, when one each of pupils is present in each side of the central position in the horizontal direction (boundary at which the width on the left side and the width on the right side are L/2) of the face region 801, parameters are set such that [width l1 of the upper left region 802]=[width l2 of the upper right region 803]=[half the width of the face region: L/2] is satisfied. Also, if the both pupils are present on one side (on the same direction side) of the central position of the face region 801 in the horizontal direction (if the detection position of either the right side pupil or the left side pupil enters a region on the other pupil side beyond the center of the face region), the adjustment according to the inclination of the face as described above is performed. For example, as shown in FIG. 8E, although the face is slightly inclined, if the inclination of the face is a predetermined amount or less, that is, one each of the pupils is present in each side of the central position of the face region 801 in the horizontal direction (boundary at which the left side width and the right side width are both L/2), the widths are set such that width l1=width l2=L/2. Also, as shown in FIG. 8C, if the face is inclined significantly, and the inclination of the face is more than the predetermined amount, that is, both pupils are located on one side of the central position of the face region 801 in the horizontal direction, l1 and l2 are adjusted as described in FIG. 8C, and set to different values.

Note that when the display destination is the electronic viewfinder 28b, it is determined which of the regions described in FIGS. 7A to 7F or FIGS. 8A to 8E, of the face under LV that is displayed in the electronic viewfinder 28b, the cursor indicating the designated position when touch-up is performed is located therein. Furthermore, in steps S307, S308, and S311, when the backside display panel 28a is the display destination, the region is determined based on the touchdown position (touch position when touch-down is performed), but the region may be determined not based on the touchdown position, but based on the touch-up position.

In step S313 (FIG. 3B), the system control unit 50 determines whether or not the position at which touch operation is performed is a position of a later-described cancel touch button. If the position is not the position of the cancel touch button, the processing advances to step S314, and if the position is the position of the cancel touch button, the processing advances to step S315. In step S314, the system control unit 50 executes body tracking of the object at the designated position as the tracking target. That is, the same object, which is determined based on conditions such as the color, contrast, and shape of the object at the designated position in the LV image, is continuously tracked, as the AF target, even if the object moves in the LV image. In step S315, the system control unit 50 cancels the tracking state, and enters a tracking stand-by state.

In step S316 (FIG. 3A), the system control unit 50 determines whether or not the shutter button 61 was pressed half-way and the first shutter switch 62 has been turned on (whether or not the shooting preparation instruction is performed). If the shutter button 61 is pressed half-way, the processing advances to step S317 (FIG. 3C), and if not, the processing advances to step S324.

In steps S317 to S323 (FIG. 3C), the shooting preparation operation initiated by the shutter button 61 being pressed half-way is executed, and upon detecting the shutter button 61 being pressed fully, the shooting processing is executed. First, in step S317, the system control unit 50 performs later-described AF processing. The AF processing will be described using FIGS. 5A and 5B. In step S318, the system control unit 50 performs photometry processing. In step S319, the system control unit 50 determines whether or not the shutter button 61 was pressed fully, and the second shutter switch 64 is turned on. If the shutter button 61 was pressed fully, the processing advances to step S321, and if not, the processing advances to step S320. In step S320, the system control unit 50 determines whether or not the first shutter switch 62 is kept on (the shutter button 61 is kept to be pressed half-way). If the first shutter switch 62 is kept on, the processing advances to step S319, and if not, the processing advances to step S302.

If it has been determined that the second shutter switch 64 is turned on (the shutter button 61 is pressed fully) in step S319, in step S321, the system control unit 50 performs shooting processing. This shooting is not for live view shooting, and is actual shooting for storing the image as an image file in the memory medium. Exposure is performed at the set exposure conditions (shutter speed, F-number), signals are read out from the image capture unit 22, and the signals undergo image processing so as to generate an image to be stored in the memory medium 200. In step S322, the system control unit 50 stores the image shot in step S321 in the memory medium 200. Note that the system control unit 50 may perform, at the same time, a quick review (REC review) display to display the shot image for confirmation before re-starting the LV display in step S323. In step S323, the system control unit 50 re-starts capturing the LV image, and displays the live view image in the display unit 28.

In step S316 (FIG. 3A), if the turning on of the first shutter switch 62 (a state in which the shutter button is pressed half-way) has not been detected, in step S324, the system control unit 50 determines whether or not another operation has been performed on the operation unit 70. If it is determined that another operation has been performed, the processing advances to step S325, and if not, the processing advances to step S326. In step S325, the system control unit 50 performs the other operation. For example, according to the operation unit 70 being operated, processing such as changing shooting parameters such as shutter speed is performed. On the other hand, in step S326, the system control unit 50 determines whether or not an end operation (power off operation, operation to change to another operation mode such as reproduction mode, or the like) has been performed on the operation unit 70. If it is determined that an end operation has been performed, this processing is ended. If it is determined that an end operation has not been performed, the processing returns to step S302, and above-described operations will be repeated.

Figure 4A:
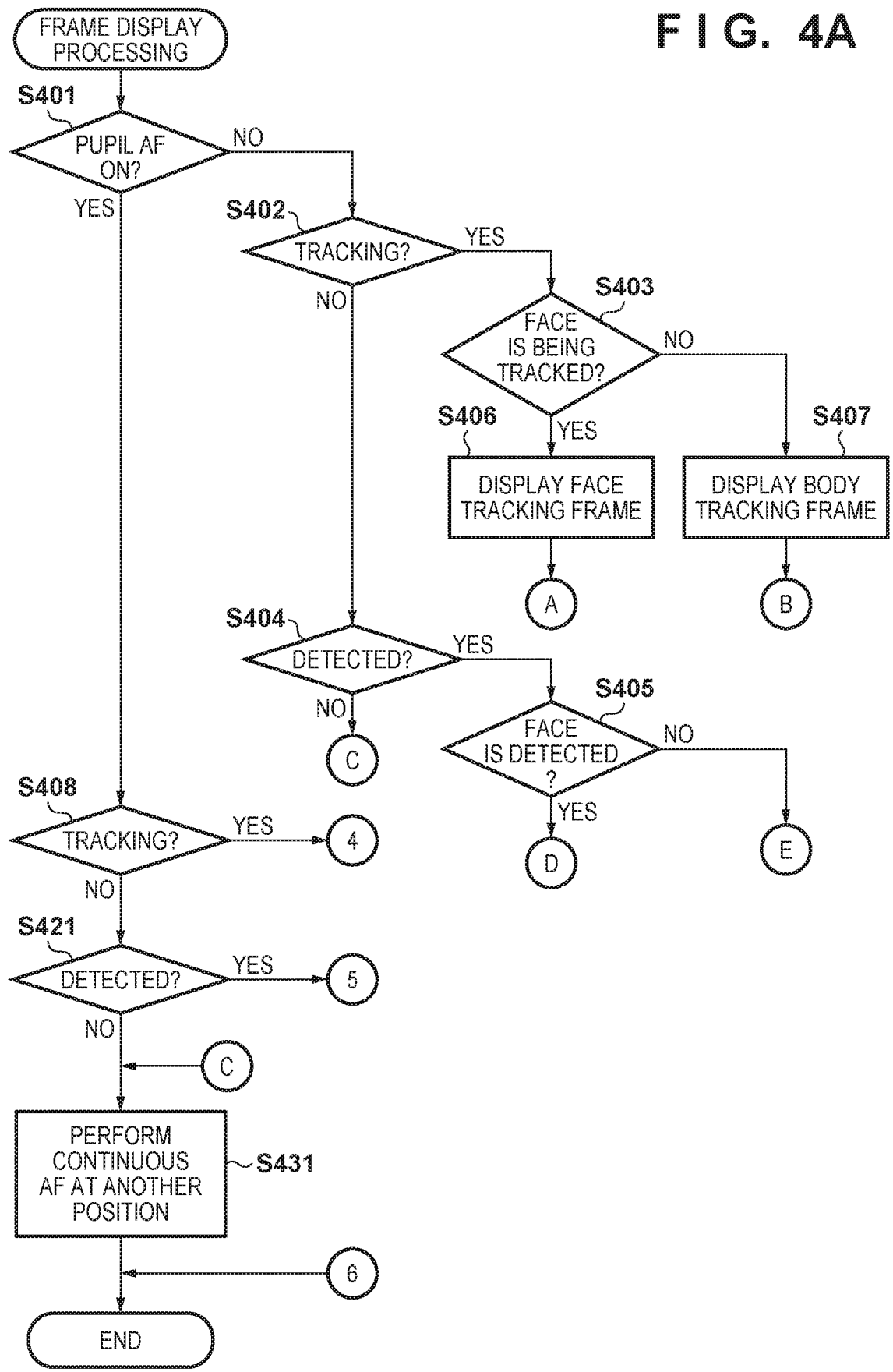
Figure 4C:
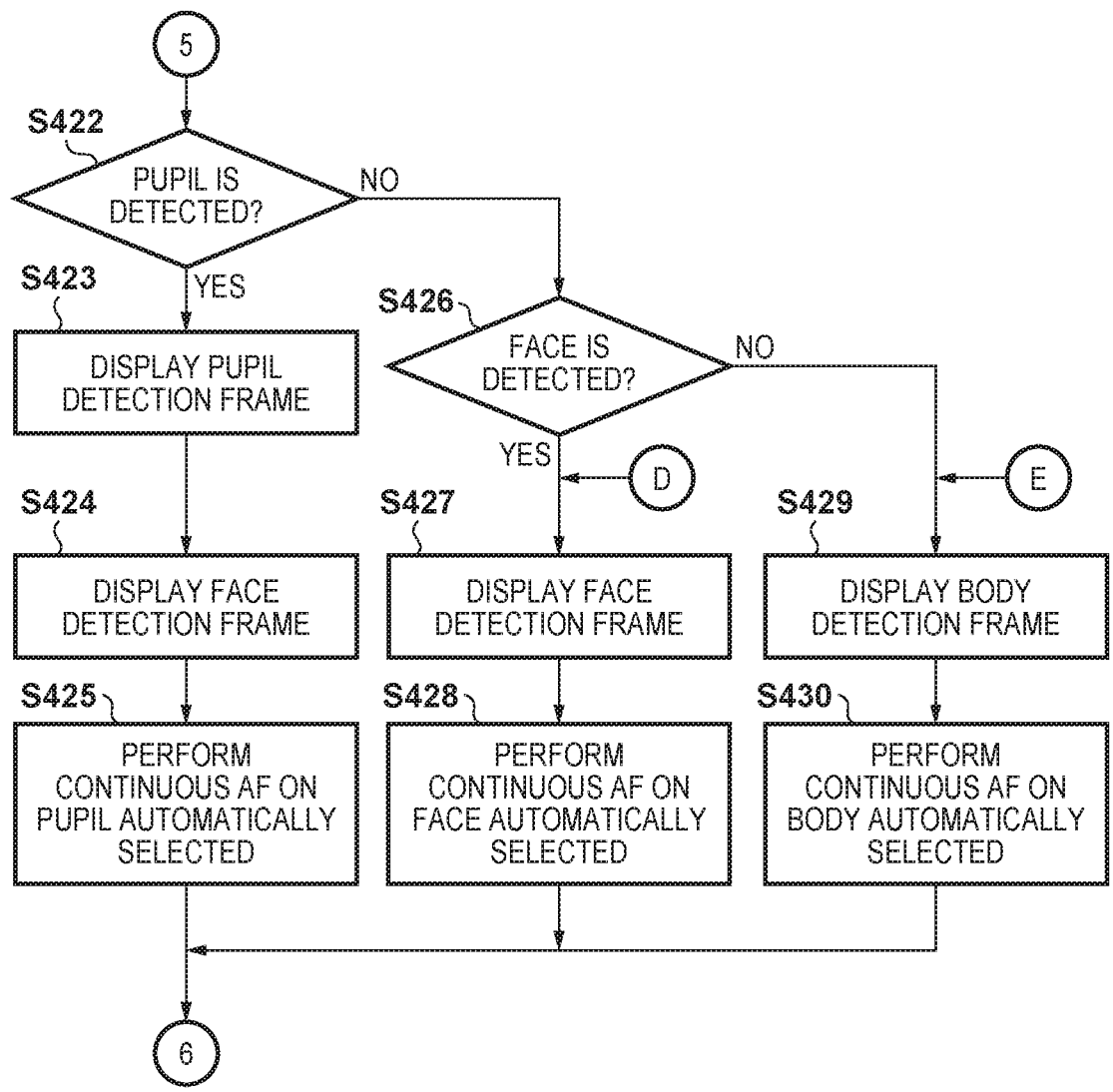

FIGS. 4A to 4C are flowcharts illustrating, in detail, the frame display processing in step S302 described in FIGS. 3A to 3C. Also, FIGS. 6A to 6L are schematic diagrams illustrating exemplary screens in the present embodiment. In the present embodiment, an item (frame) indicating the state in which an object has been detected and an item (frame) indicating the state in which an object is being tracked are displayed so as to be superimposed on the LV image.

In step S401 (FIG. 4A), the system control unit 50 refers to setting information stored in the nonvolatile memory 56, and determines whether or not the pupil AF setting is turned on (pupil AF ON or pupil AF OFF). If the pupil AF is turned on, the processing advances to step S408, and if not (if the pupil AF is turned off), the processing advances to step S402. In step S402, the system control unit 50 determines whether or not an object is being tracked. If an object is being tracked, the processing advances to step S403, and if not, that is, if being in the tracking stand-by state, the processing advances to step S404.

Figure 6A:
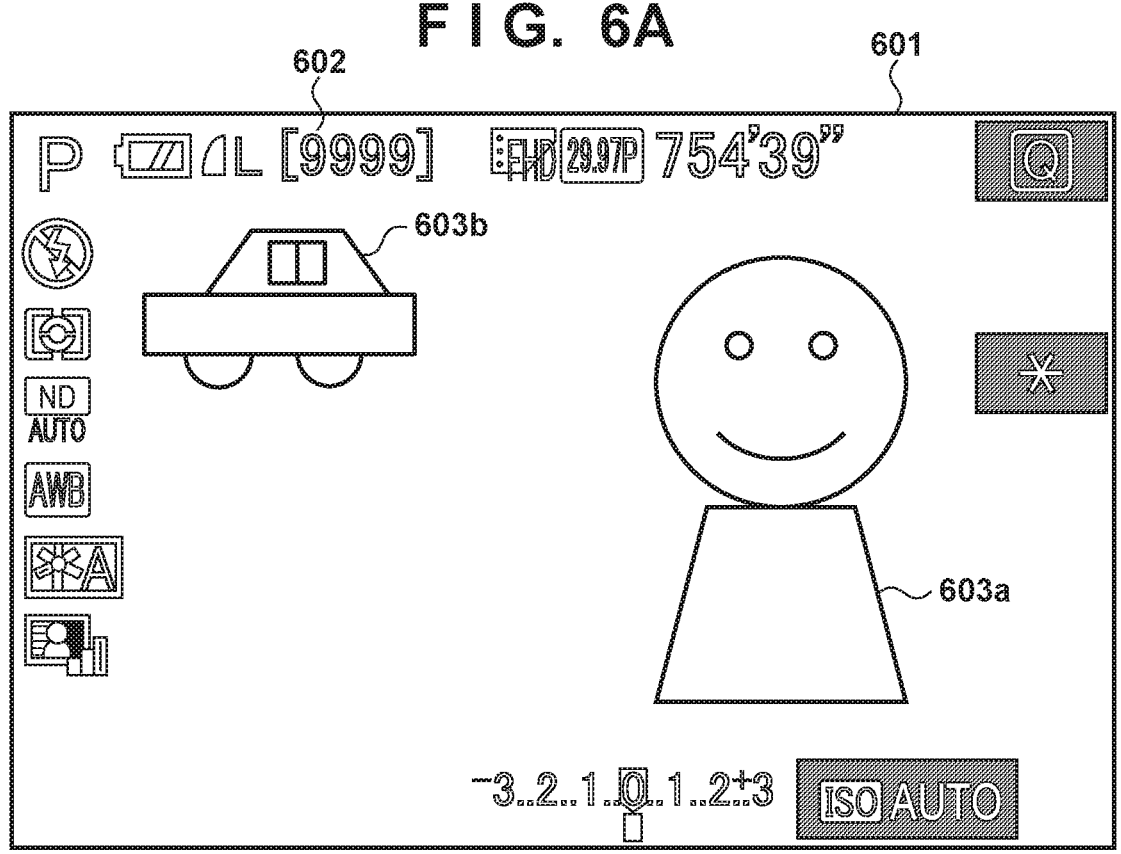
FIGS. 6A to 6L are schematic diagrams illustrating exemplary screens in the embodiment.
Figure 6B:
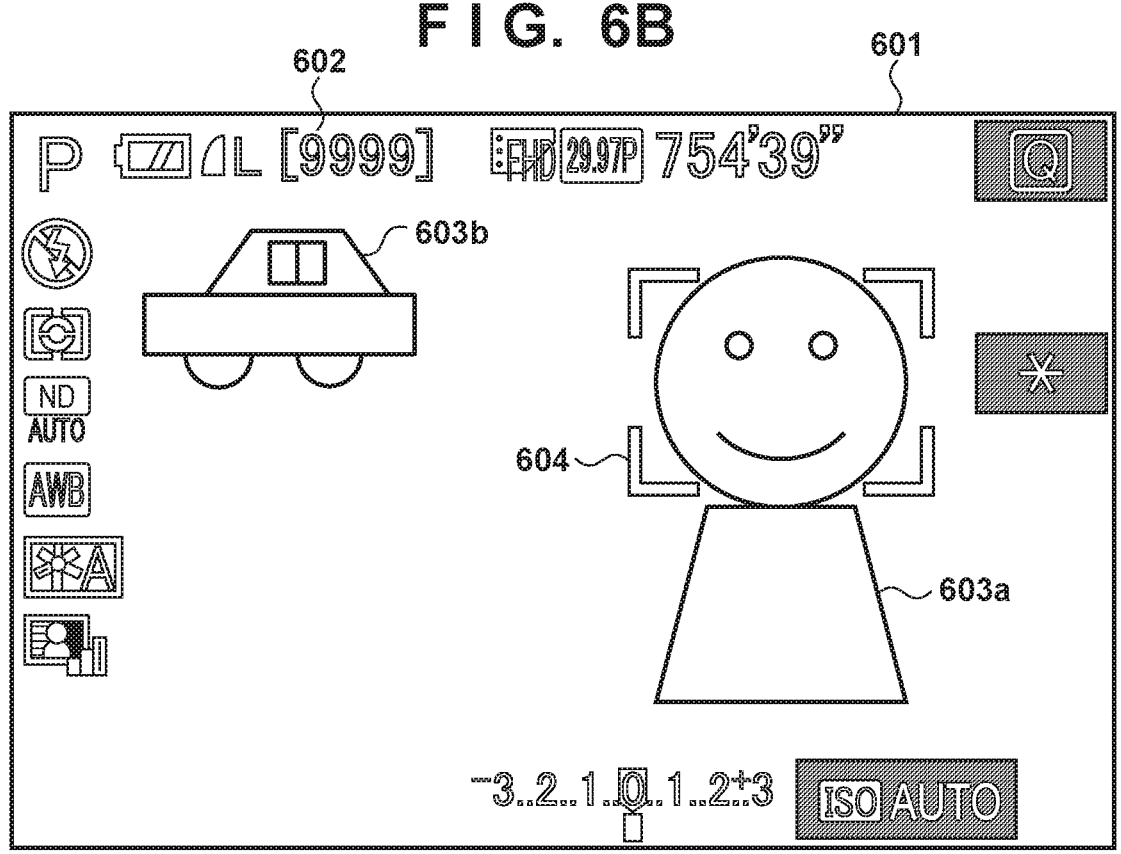
Figure 6C:
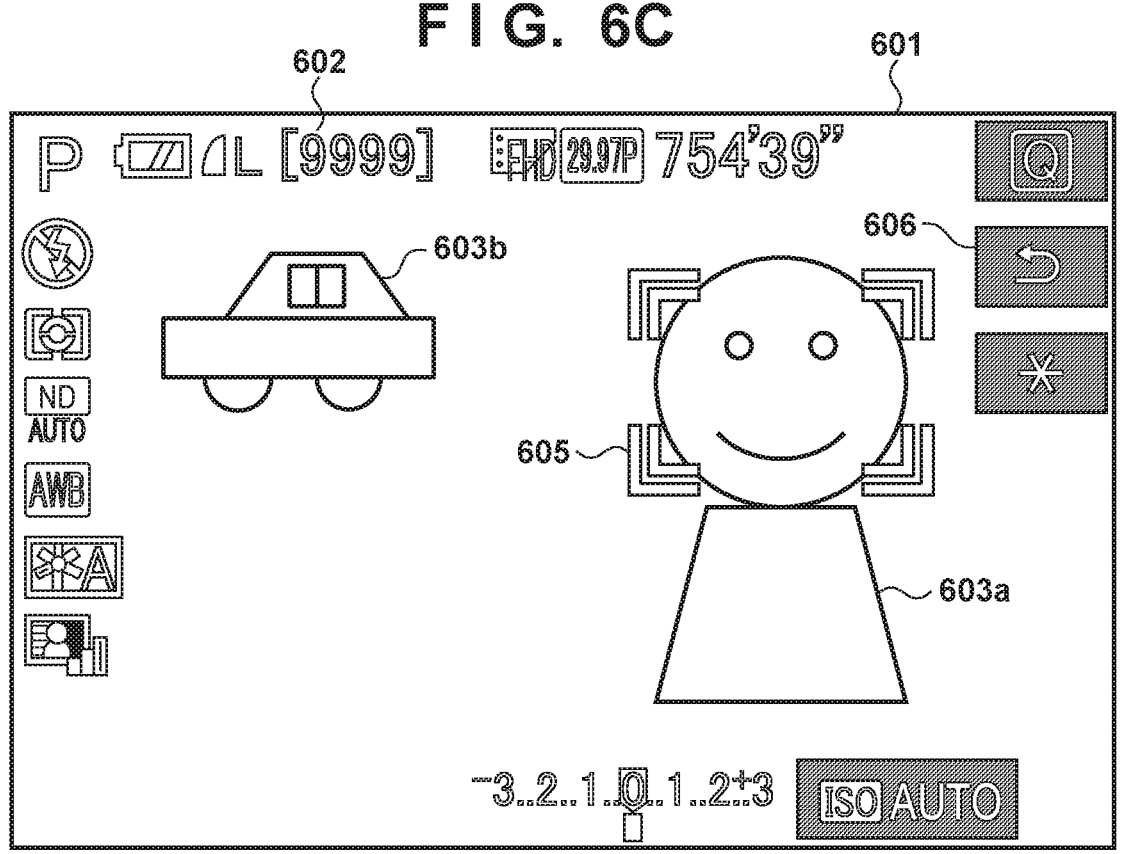
Figure 6D:
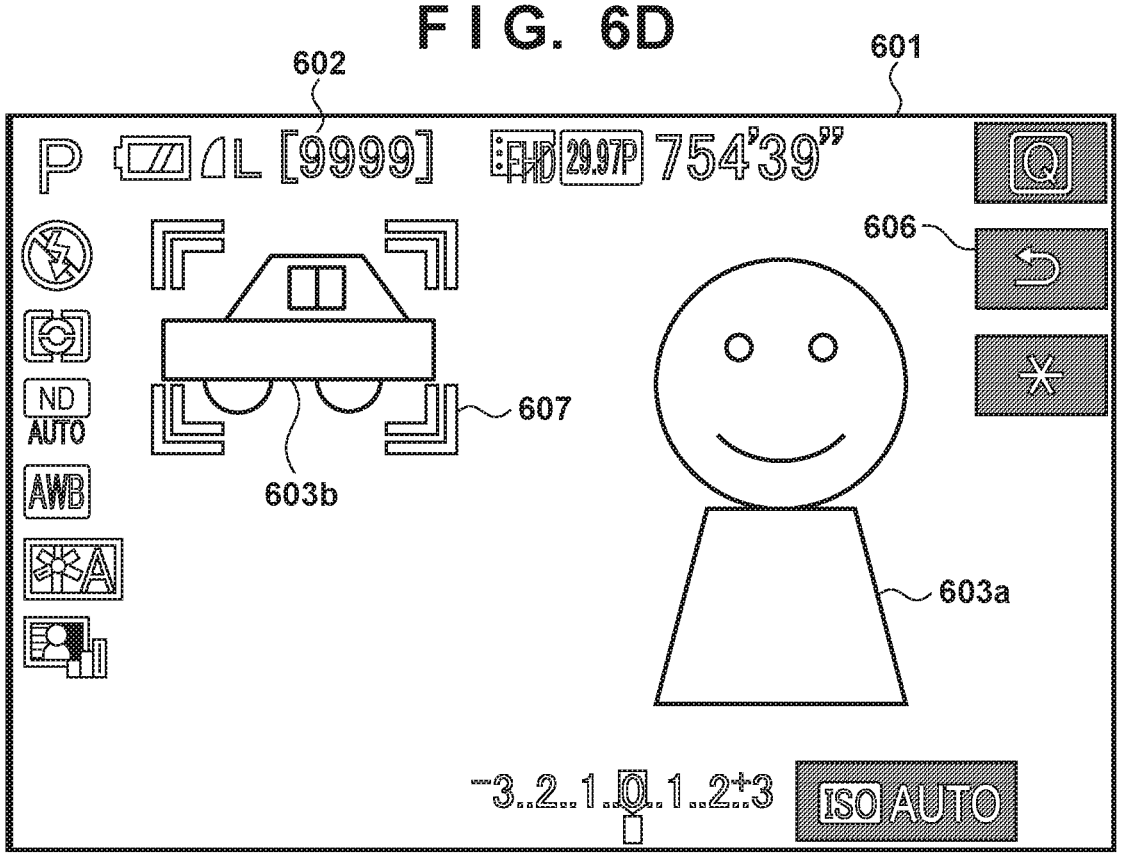
Figure 6E:
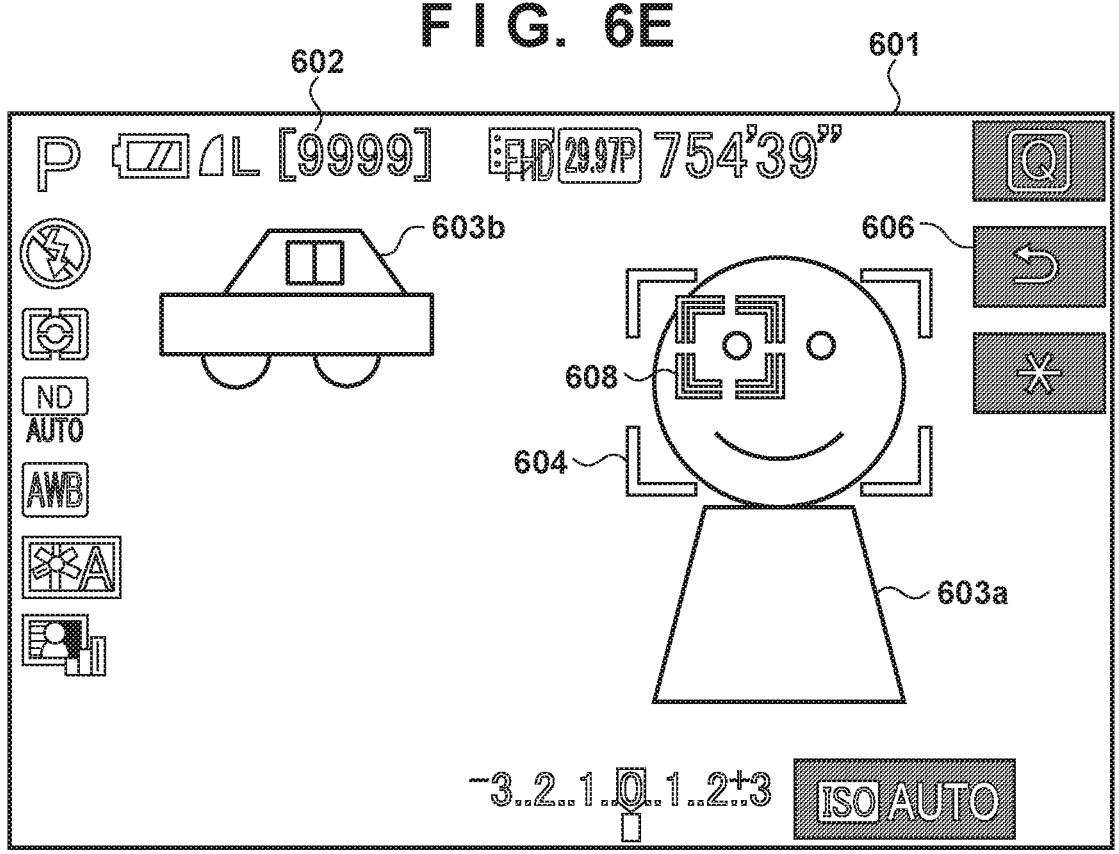
Figure 6F:
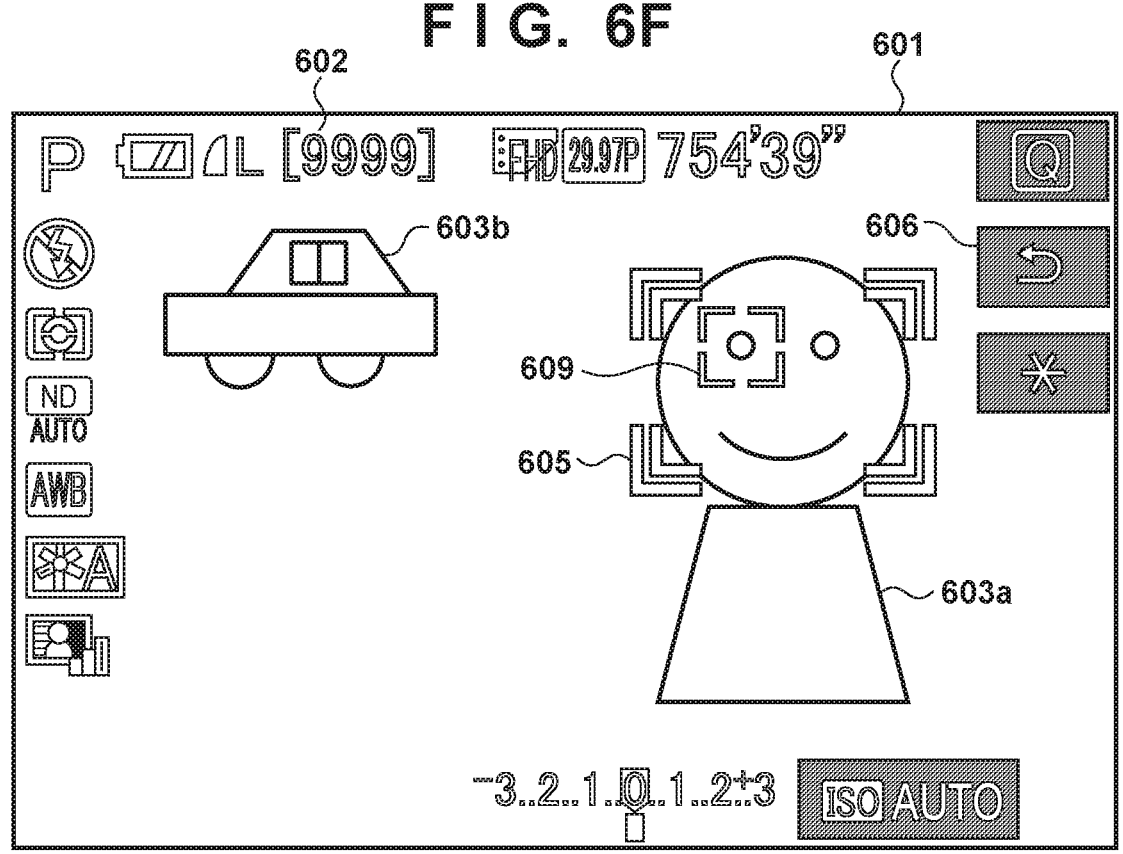
Figure 6G:
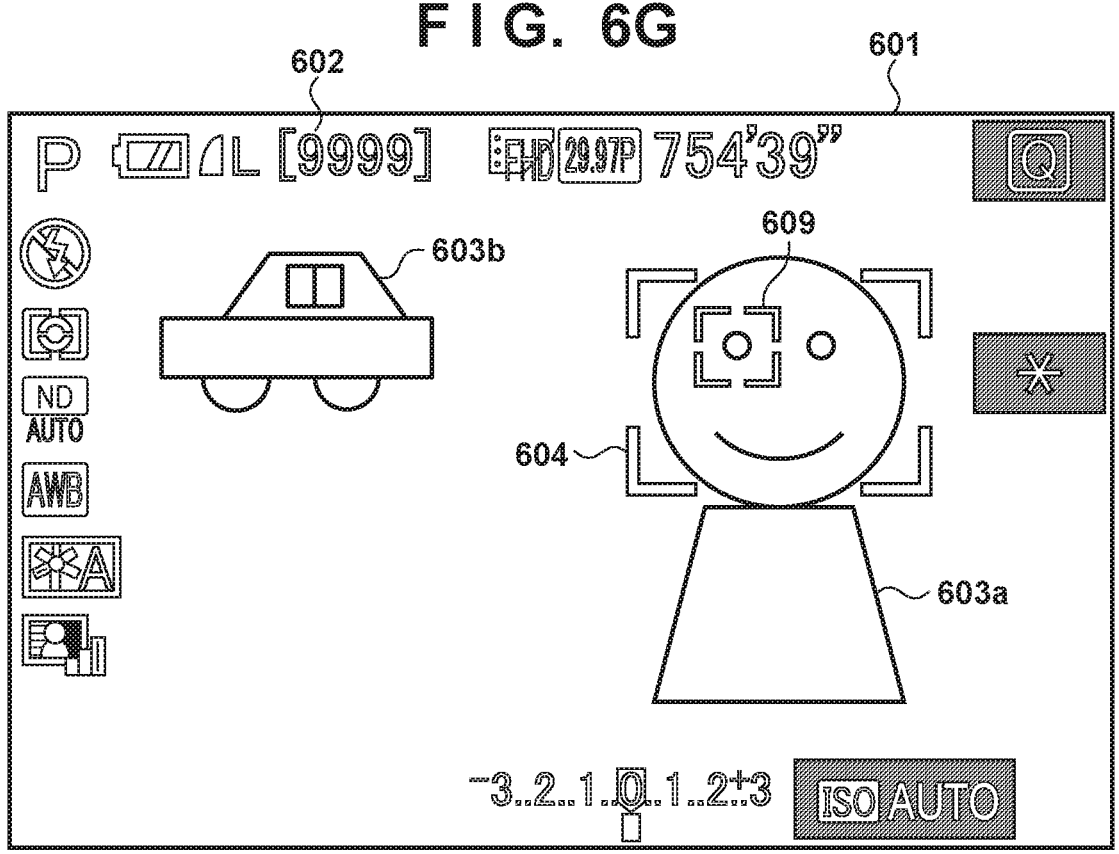
Figure 6H:
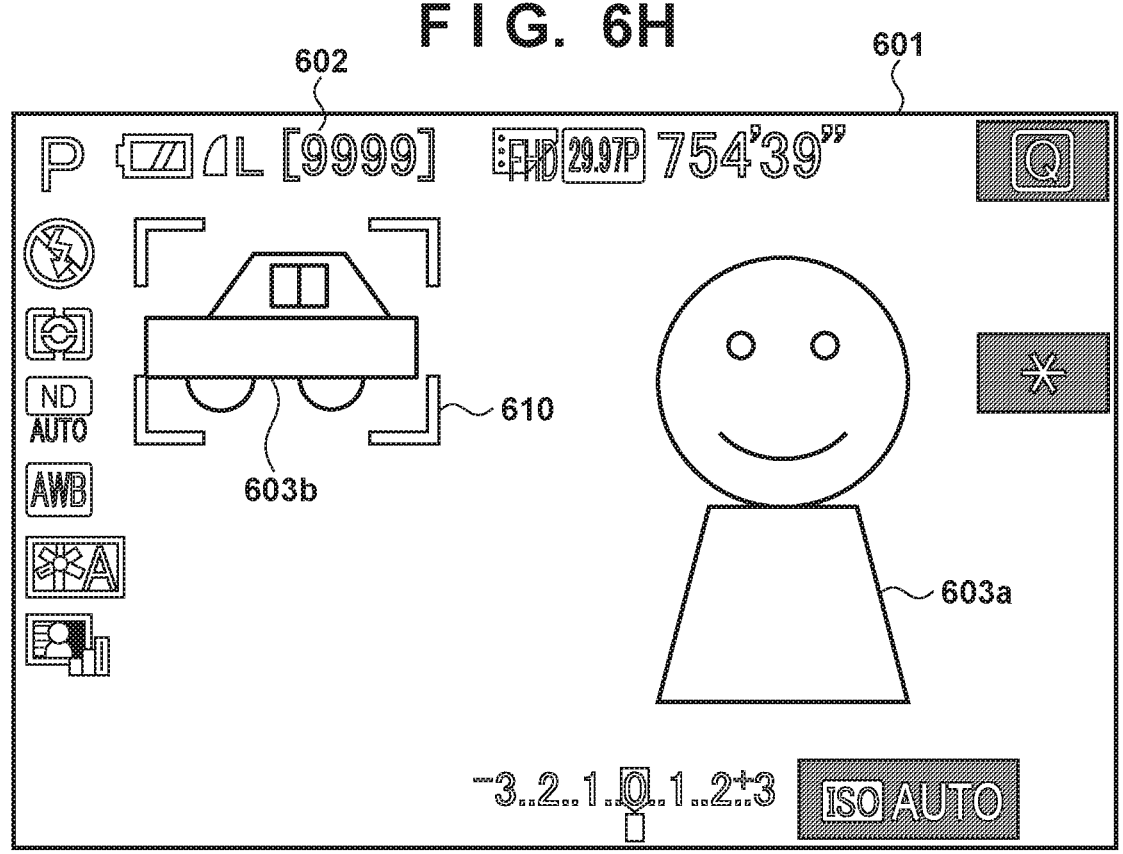

In step S404, the system control unit 50 determines whether or not a face or a body has been detected. If a face or a body has been detected, the processing advances to step S405, and if not, the processing advances to step S431. FIG. 6A is an exemplary display of the LV image 601 when a face has not been detected in the tracking stand-by state. This is a case where the condition to advance to step S431 is satisfied, and corresponds to the display state before the shutter button 61 is pressed half-way. A shooting information display 602 is displayed so as to be superimposed on the LV image 601. In the LV image 601, objects 603 (human object 603a, body (automobile) object 603b) are illustrated. FIG. 6A is an exemplary display when these objects are not detected. In actuality, when an object is shot from which a person or a body cannot be detected, such as in a case where only a wall or the sky is shot, this display state is entered. If it is determined, in step S404, that a face or a body has been detected, in step S405, the system control unit 50 determines whether or not a human face has been detected. If a human face has been detected, the processing advances to step S427 (face detection frame 604 is displayed, as shown in FIG. 6B) in later-described FIG. 4C, and if not, the processing advances to step S429 (body detection frame 610 is displayed, as shown in FIG. 6H) in later-described FIG. 4C.

In step S402 (FIG. 4A), if it is determined that no object is being tracked, in step S403, the system control unit 50 determines whether or not the face of an object is being tracked. If a face is being tracked, the processing advances to step S406, and if not, the processing advances to step S407. In step S406, the system control unit 50 displays a face tracking frame in the display unit 28, and advances the processing to step S418 (continuous AF is performed on the face being tracked) in FIG. 4B. FIG. 6C is an exemplary display when the face of an object 603a is being tracked. The system control unit 50 displays the face tracking frame 605 so as to surround the human face, and displays a tracking cancel button 606, which is a touch button to cancel the tracking state, at a screen end. On the other hand, in step S407 in FIG. 4A, the system control unit 50 displays a body tracking frame in the display unit 28, and advances the processing to step S420 (continuous AF is performed on the body being tracked) in FIG. 4B. FIG. 6D is an exemplary display when a body is being tracked. The body tracking frame 607 is displayed so as to surround a car.

If it is determined that the pupil AF is turned on in step S401 (FIG. 4A), in step S408, the system control unit 50 determines whether or not an object is being tracked. If an object is being tracked, the processing advances to step S409 (FIG. 4B), and if not, the processing advances to step S421 (FIG. 4A). In step S409 (FIG. 4B), the system control unit 50 determines whether or not a pupil of the object is being tracked. If a pupil is being tracked, the processing advances to step S410, and if not, the processing advances to step S413.

In step S410, the system control unit 50 displays a pupil tracking frame in the display unit 28. Also, if a pupil has been detected, a face has also been detected. Therefore, in step S411, the system control unit 50 displays a face detection frame at the position of the face so as to be superimposed on the LV image 601 in the display unit 28. FIG. 6E is an exemplary display of a state in which a pupil is being tracked. In the LV image 601, a pupil tracking frame 608 is displayed so as to surround the pupil. Also, when a pupil has been detected, a face has also been detected, and therefore, a face detection frame 604 is also displayed on the LV image 601.

In step S412, the system control unit 50 sets the position of the pupil being tracked to the target position (AF position) of continuous AF, and performs continuous AF. Here, the pupil on a side designated by the user, of the left and right eyes of the detected face, as the tracking target is the target of continuous AF. That is, the eye designated by the user as the tracking target is the target of AF, regardless of whether or not the eye being closer to the digital camera 100, or being bigger than the other eye. As a result of setting a pupil as the tracking target, in this way, the pupil intended by the user can be set as the target of AF. The continuous AF, here, is a function of automatically bringing an object into focus continuously according to the position of the object in a waiting period in which shooting operation is not performed.

In step S409, if it has been determined that a pupil is not being tracked, in step S413, the system control unit 50 determines whether or not the face of an object is being tracked. If the face of an object is being tracked, the processing advances to step S414, and if not the processing advances to step S419. In step S414, the system control unit 50 displays a face tracking frame in the display unit 28. As shown in FIG. 6C, a face tracking frame 605 is displayed so as to surround the face being tracked on the LV image 601. In step S415, the system control unit 50 determines whether or not a pupil of an object has been detected. If a pupil of an object has been detected, the processing advances to step S416, and if not, the processing advances to step S418.

In step S416, the system control unit 50 displays a pupil detection frame in the display unit 28 in addition to the face tracking frame. FIG. 6F shows an exemplary display in a state in which a pupil has been detected and a face is being tracked. A pupil detection frame 609 is displayed so as to surround the pupil in the LV image 601. Also, since the face is being tracked, the face tracking frame 605 displayed in step S414 is continuously displayed. Thereafter, in step S417, the system control unit 50, sets the position of the detected pupil to the target position of continuous AF, and performs continuous AF. If a face is being tracked and a pupil has been detected, even if the pupil is not being tracked, AF is performed on the detected pupil. Note that, here, the pupil to be the AF target is a pupil determined by the system control unit 50 to be a main object and automatically selected, out of the left and right eyes of the face being tracked. The system control unit 50 basically selects the eye (eye on the close end side) closer to the digital camera 100 or the eye bigger than the other eye, and sets the selected eye to the AF target.

If it is determined that no pupil has been detected in step S415, in step S418, the system control unit 50 sets the position of the face being tracked to the target position of continuous AF, and performs continuous AF. Here, since no pupil has been detected. AF is performed by setting the entire face or one point at the center of the face, which are not related to the positions of pupils, to the AF target.

If it is determined that neither a pupil nor a face is being tracked (NO in steps S409 and S413), in step S419, the system control unit 50 displays a body tracking frame in the display unit 28. An exemplary display of the body tracking frame is as shown in above-described FIG. 6D. In step S420, the system control unit 50 sets the position of the body being tracked to the target position of continuous AF, and performs continuous AF.

If it is determined that no object is being tracked in step S408 (FIG. 4A), in step S421, the system control unit 50 determines whether or not any of objects of a face and a pupil of a person, and a body has been detected. If it is determined that such an object has been detected, the processing advances to step S422 (FIG. 4C), and if not (that is, in a state in which none of a face, a pupil, and a body has been detected), the processing advances to step S431 (FIG. 4A).

In step S422 (FIG. 4C), the system control unit 50 determines whether or not a pupil of an object has been detected. If a pupil of an object has been detected, the processing advances to step S423, and if not, the processing advances to step S426. In step S423, the system control unit 50 displays a pupil detection frame at the position of the pupil of the detected face so as to be superimposed on the live view displayed in the display unit 28. Also, if a pupil has been detected, a face has also been detected, and therefore, in step S424, the system control unit 50 displays a face detection frame at the position of the detected face so as to be superimposed on the live view displayed in the display unit 28. FIG. 6G is an exemplary display in a state in which a face and a pupil have been detected in step S424. A face detection frame 604 and a pupil detection frame 609 are displayed so as to respectively surround the face and the pupil. In step S425, the system control unit 50 sets the position of the detected pupil to the continuous AF position, similarly to step S417, and performs continuous AF. Here, the pupil to be the AF target is a pupil determined by the system control unit 50 to be a main object and automatically selected, out of the left and right eyes of the face being tracked.

If it is determined that no pupil has been detected in step S422, in step S426, the system control unit 50 determines whether or not a human face has been detected. If it is determined that a face has been detected, the processing advances to step S427, and if not, the processing advances to step S429. In step S427, the system control unit 50 displays a face detection frame at the position of the detected face so as to be superimposed on the live view displayed in the display unit 28. FIG. 6B shows a state in which a face detection frame 604 is displayed. In step S428, the system control unit 50 sets the position of the detected face to the continuous AF position, and performs continuous AF.

If the object under detection is neither of a pupil nor a face (NO in steps S422 and S426), in step S429, the system control unit 50 displays a body detection frame at the position of the detected body so as to be superimposed on the live view displayed in the display unit 28. FIG. 6H is a diagram illustrating a state in which a body has been detected. A body detection frame 610 is displayed so as to surround a car (object 603b). In step S430, the system control unit 50 sets the position of the detected body to the continuous AF position, and performs continuous AF.

If no object is being tracked or being detected (NO in step S404 or NO in step S421), in step S431, regardless of whether or not the pupil AF is turned on, the system control unit 50 sets another position to the continuous AF position, and performs continuous AF.

Note that the face detection frame 604, the pupil detection frame 609, and the body detection frame 610, which are items indicating the respective detected objects (items each indicating that the object is in a detected state) use a single frame indicating the detected range. In this way, the items indicating detected states use the same representation regardless of the object. Also, the face tracking frame 605, the body tracking frame 607, and the pupil tracking frame 608, which are items each indicating a state of being designated as the tracking target, use a double frame indicating the range of the tracking target object. In this way, the items indicating the state of being designated as the tracking target use the same representation regardless of the object, but use a representation different from that of the items indicating the detected state. Note that the display mode of the items indicating the detected state and the tracking state are not limited to the above example (single frame and double frame).

Figure 5B:
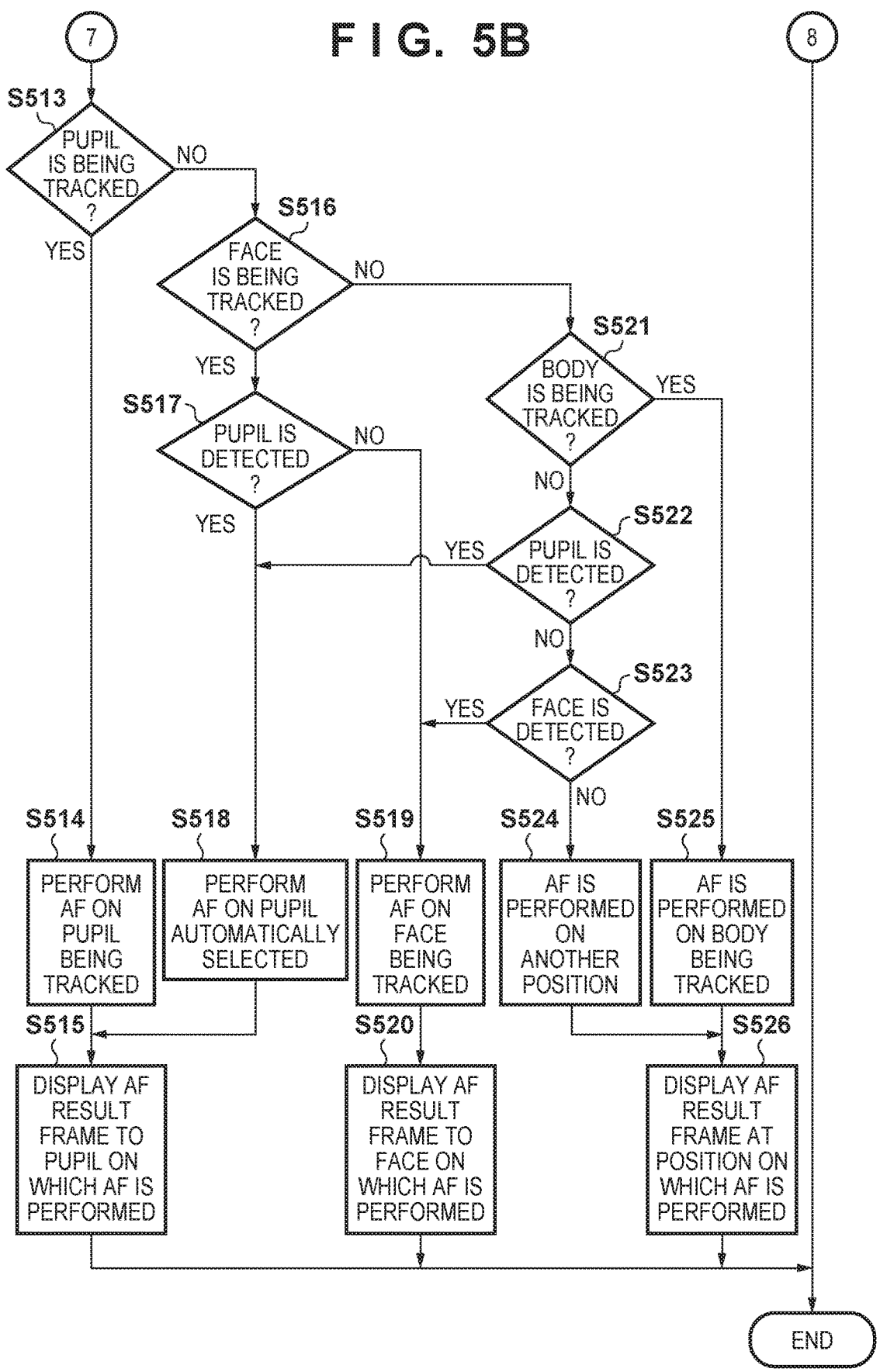

FIGS. 5A and 5B are flowcharts relating to AF processing of the digital camera 100 according to the present embodiment.

In step S501 (FIG. 5A), the system control unit 50 refers to setting information stored in the nonvolatile memory 56, and determines whether or not the pupil AF is turned on. If the pupil AF is turned on, the processing advances to step S513 (FIG. 5B), and if not, the processing advances to step S502 (FIG. 5A). The processing in steps S502 to S512 (FIG. 5A) is AF processing when the pupil AF is turned off. Also, the processing in steps S513 to S526 (FIG. 5B) is AF processing when the pupil AF is turned on.

In step S502 (FIG. 5A), the system control unit 50 determines whether or not the face of an object is being tracked. If a face is being tracked, the processing advances to step S503, and if not, the processing advances to step S507. In step S503, the system control unit 50 determines whether or not a pupil of the object has been detected. If a pupil has been detected, the processing advances to step S504, and if not, the processing advances to step S505. In step S504, the system control unit 50 set the position of the detected pupil to the AF position, and performs AF. Here, the pupil to be the AF target is a pupil determined by the system control unit 50 to be a main object and automatically selected, out of the left and right eyes of the face being tracked. On the other hand, in step S505, the system control unit 50 sets the position of the face being tracked to the AF position, and performs AF.

Figure 6I:
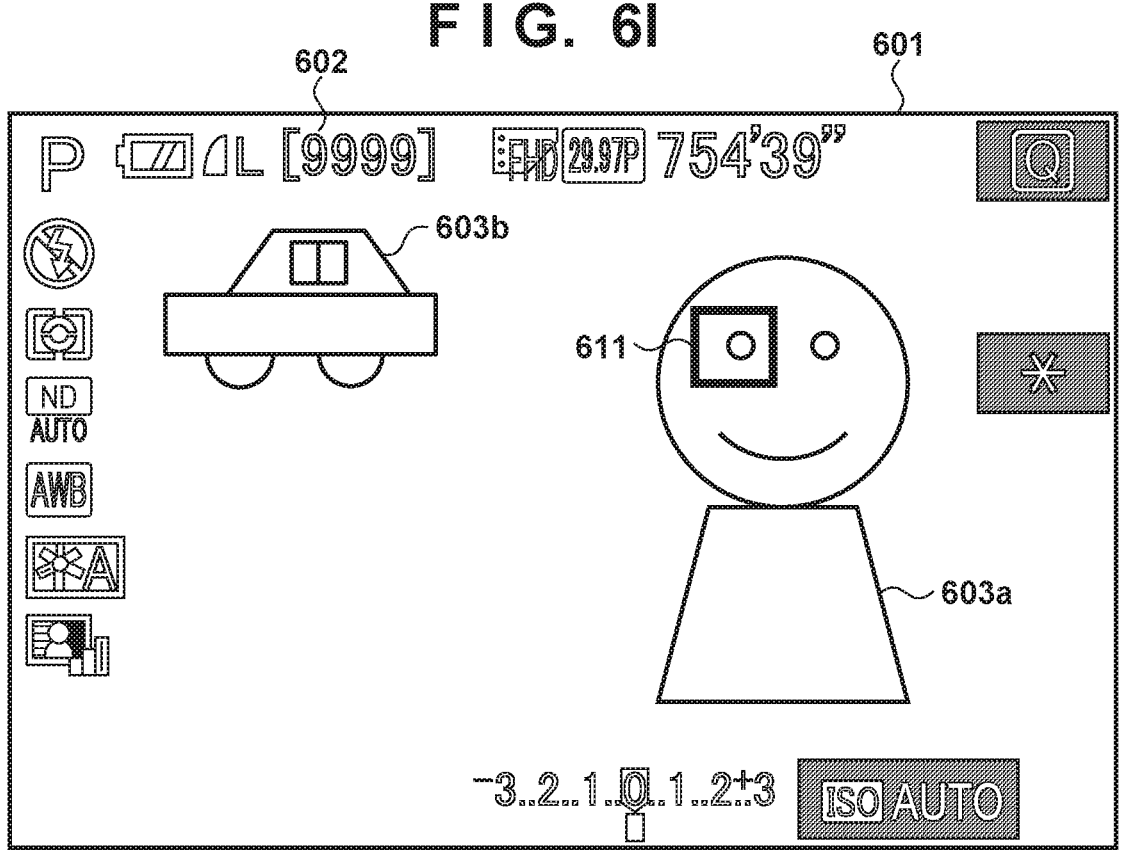
Figure 6J:
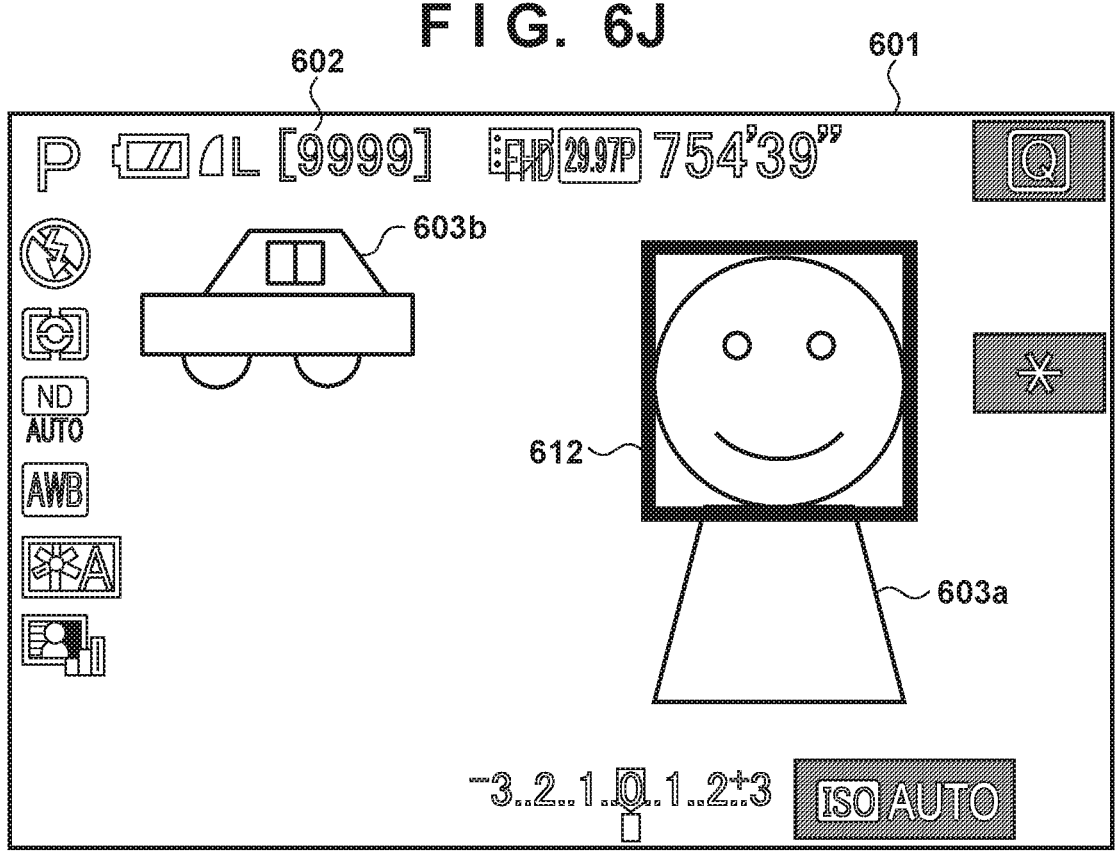

In step S506, the system control unit 50 displays an AF result frame in the display unit 28 at the position of the pupil on which AF has been performed in step S504, or at the position of the face on which AF has been performed in step S505. When AF in response to the shutter button 61 being pressed half-way is performed, an item (face, pupil, or body detection frame) indicating the state of being detected and an item (face, pupil, or body tracking frame) indicating the state of being designated are hidden, and the AF result frame is displayed. For example, when AF is completed in the state in FIG. 6F, the tracking frame and the detection frame are hidden, and the AF result frame is displayed, as in FIG. 6J. FIG. 6J is an exemplary display when a face AF result frame 612 is displayed at the position of the face in the LV image 601. The face AF result frame 612 is displayed so as to surround the face. Note that if step S506 has been reached via step S504 as well, the face AF result frame 612 is displayed instead of the pupil AF result frame. This is because, since the user tuned off the pupil AF setting, the user is assumed to expect that AF is performed on the entirety of the face of the object.

If the AF result frame is displayed not to the face but to the pupil, it is possible that the user will misunderstand that, in spite of the fact that the pupil AF setting is turned off, the setting was not reflected, and therefore pupil AF has been performed. Alternatively, although the user expected that an AF result frame would be displayed on the face, the AF result frame is displayed on the pupil, and as a result, the user may have a sense of incongruity. If the user misunderstands or has a sense of incongruity in this way, it is possible that the user will repeat operations in which the state in which the shutter button 61 is pressed half-way is cancelled, and again the shutter button 61 is pressed half-way to perform AF (perform re-AF) until the AF result frame is displayed at the face as expected. In this case, the user may miss a photo opportunity. In order to prevent such a situation to arise in advance, and match the expectations of the user, in the present embodiment, if the processing has reached step S506 via step S504 as well, the AF result frame is displayed so as to surround not the pupil but the face. With this, the user can be notified of the AF result without having a sense of incongruity, and can perform following shooting operations smoothly.

In step S502, if it is determined that a face is not being tracked, in step S507, the system control unit 50 determines whether or not a body is being tracked. If it is determined that a body is being tracked, the processing advances to step S511, and if not, processing advances to step S508. In step S508, the system control unit 50 determines whether or not a pupil of an object has been detected. If it is determined that a pupil has been detected, the processing advances to the above-described step S504 (AF is performed on an automatically selected pupil), and if not, the processing advances to step S509. In step S509, the system control unit 50 determines whether or not the face of an object has been detected. If the face of an object has been detected, the processing advances to the above-described step S505 (AF is performed on the face being tracked), and if not, the processing advances to step S510.

Figure 6K:
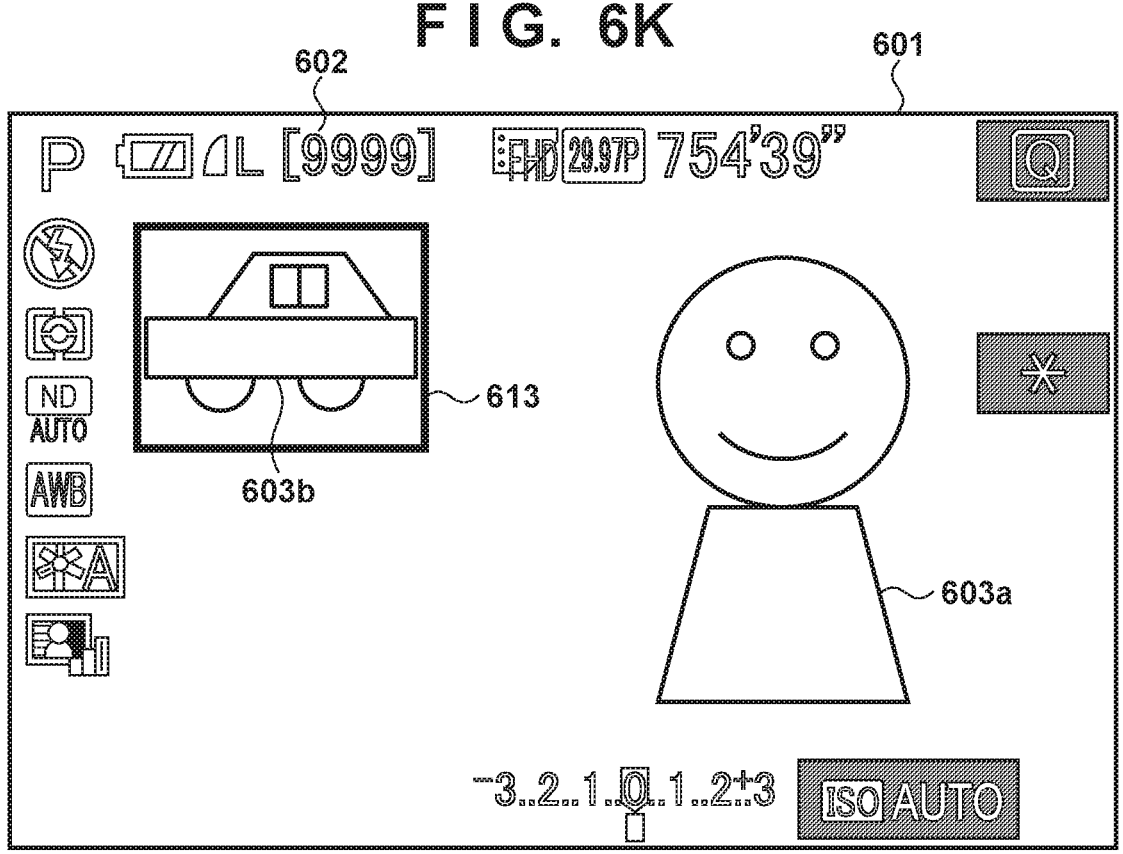
Figure 6L:
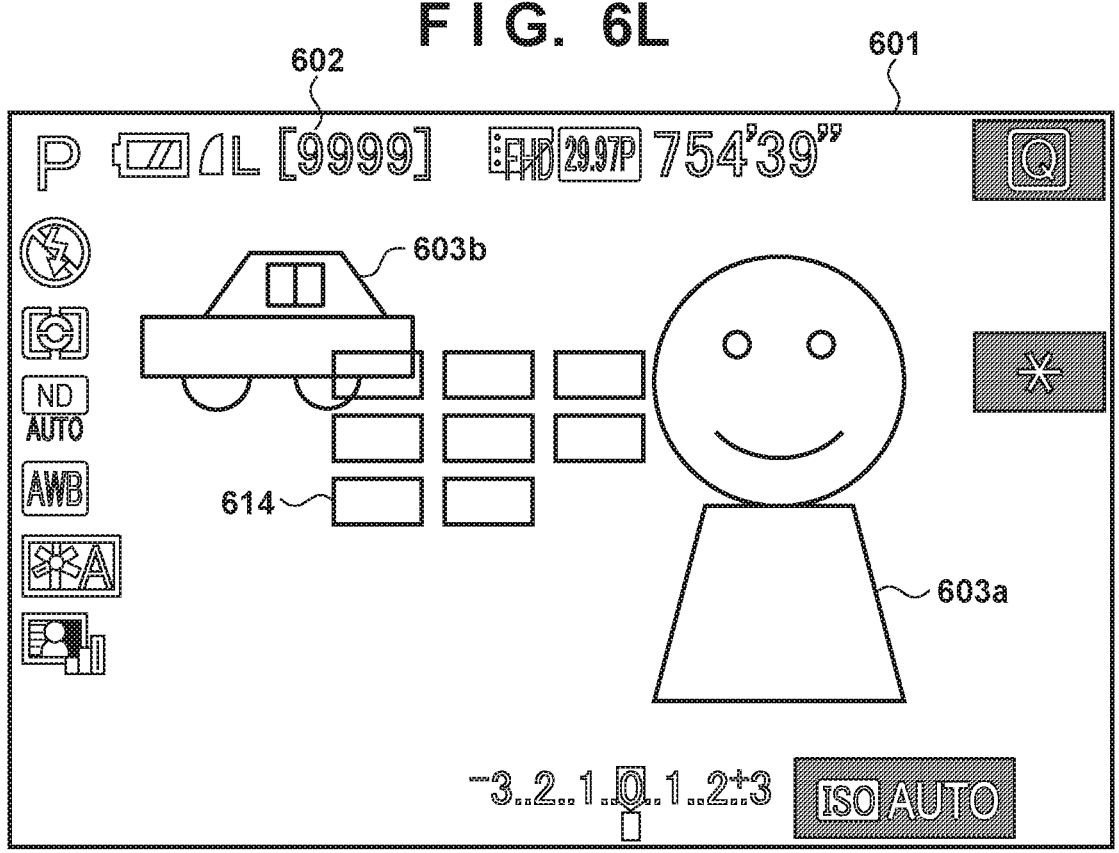

In step S510, the system control unit 50 sets another position (position at which a main object is located that is automatically determined by the system control unit 50, the main object being none of a face, a pupil, and a body because none of a face, a pupil, and a body has been detected) to the AF position, and performs AF. If a body is being tracked (YES in step S507), in step S511, the system control unit 50 set the position of the body being tracked to the AF position, and performs AF. In step S512, the system control unit 50 displays an AF result frame in the display unit 28 at a position of the body or at another position that has been set as the AF position. FIG. 6L is an exemplary display when an AF result frame is displayed at another position when the processing has reached step S512 via step S510. A multi-point AF result frame 614 is displayed in the screen of the LV image 601 at a position automatically detected by the camera. Also, FIG. 6K is an exemplary display when an AF result frame is displayed at the position of the body being tracked when the processing has reached step S512 via step S511. A body AF result frame 613 is displayed so as to surround the body (object 603b).

Next, the AF operation when pupil AF is turned on (YES in step S501) will be described. First, in step S513 (FIG. 5B), the system control unit 50 determines whether or not a pupil of an object is being tracked. If it is determined that a pupil is being tracked, the processing advances to step S514, and if not, the processing advances to step S516. In step S514, the system control unit 50 sets the position of the pupil being tracked to the AF position, and performs AF. Then, in step S515, the system control unit 50 displays an AF result frame in the display unit 28 at the position of the pupil (the pupil being tracked) of the object, which is set as the AF position. FIG. 6I is a diagram illustrating a state in which an AF result frame is displayed at a pupil. The pupil AF result frame 611 is displayed so as to surround the pupil.

In step S513, if it is determined that no pupil is being tracked, in step S516, the system control unit 50 determines whether or not a human face is being tracked. If it is determined that a human face is being tracked, the processing advances to step S517, and if not, the processing advances to step S521. In step S517, the system control unit 50 determines whether or not a pupil of an object has been detected. If it is determined that a pupil has been detected, the processing advances to step S518, and if not, the processing advances to step S519. In step S518, the system control unit 50 sets the position of the detected pupil to the AF position and performs AF. Then, the processing advances to step S515, a pupil AF result frame is displayed at the position at which AF has been performed. The reason why a pupil AF result frame is displayed in the case where the processing has reached step S515 via step S518 (when no pupil is being tracked) as well is that, since the user turned on the setting of pupil AF, it is envisioned that the user expects to perform AF on a pupil of an object. As a result of displaying the AF result frame so as to surround not the face but the pupil, the user can be notified of the AF result without having a sense of incongruity, and can perform following shooting operations smoothly.

If the face of an object is being tracked, but no pupil has been detected (NO in step S517), in step S519, the system control unit 50 set the position of the face being tracked to the AF position, and performs AF. Then, in step S520, the system control unit 50 displays an AF result frame in the display unit 28 at the position of the face (face being tracked) of an object that has been set as the AF position.

If it is determined that neither a pupil nor a face is being tracked in steps S513 and S516, in step S521, the system control unit 50 determines whether or not a body is being tracked. If a body is being tracked, the processing advances to step S525, and if not, the processing advances to step S522. In step S522, the system control unit 50 determines whether or not a pupil of an object has been detected. If it is determined that a pupil has been detected, the processing advances to the above-described step S518, and if not, the processing advances to step S523. In step S523, the system control unit 50 determines whether or not the face of an object has been detected. If it is determined that a face has been detected, the processing advances to the above-described step S519, and if not, the processing advances to step S524.

In step S524, the system control unit 50 sets another position to the AF position, similarly to step S510. On the other hand, if it is determined, in step S521, that a body is being tracked, in step S525, the system control unit 50 sets the position of the body being tracked to the AF position, similarly to the above-described step S511. Then, in step S526, the system control unit 50 displays an AF result frame in the display unit 28 at the position of the body or another position that has been set as the AF position, similarly to the above-described step S512.

Note that the various AF result frames that are displayed in the above-described steps S506, S512, S515, S520, and S526 are displayed in forms that are different between when, as a result of performing AF, the object has been brought into focus and when the object has not been brought into focus. For example, when the object has been brought into focus, the AF result frame is displayed in green, and when the object has not been brought into focus and is out of focus, the AF result frame is displayed in grey. Furthermore, along with displaying various AF result frames, an AF result notification sound may be produced. In this case as well, notification will be made with sounds that are different between when, as a result of performing AF, the object has been brought into focus and when the object has not been brought into focus. For example, when the object has been brought into focus, a "pippip" sound is produced, and when the object has not been brought into focus and is out of focus a "pip" sound is produced.

According to the embodiment described above, in the pupil AF, the face region is equally divided vertically, and the upper half is set as the pupil selection region and the lower half is set as the face selection region, and as a result, the face or a pupil can be easily selected, and an image capture apparatus that can be easily handled can be provided. Also, an appropriate AF result frame can be displayed according to whether or not the setting of pupil AF is turned on, and the user can focus on shooting without having a sense of incongruity.

Note that, in the above-described embodiment, the detection frames and the tracking frames respectively have the same shape for the face, the pupil, and the body, but there is no limitation thereto. Frames having different shapes may be displayed according to the type of the object. If frames having the same shape are used, a UI is realized in which the face, the pupil, and the body can be selected as equivalent targets to each other. The user can enjoy shooting while easily changing the object. Also, if frames having different shapes are used according to the type of the object, which of the targets is detected and tracked is obvious. Of course, furthermore, left and right pupils may use frames having different shapes.

Note that although a description has been given above taking the electronic viewfinder as an example, an optical viewfinder may be adopted. Also, the size of the frames described above may be changed according to the situation, and the frame need not be configured by a single frame. For example, when a plurality of AF points are displayed in the display unit in advance, such as a case of an optical viewfinder, the touch position may be shown by changing colors of a plurality of AF points or the like according to the position and the area of the touched finger.

Note that the above-described various types of control, which have been described as being performed by the system control unit 50, may be performed by one piece of hardware, or the control on the entire apparatus may be performed by a plurality of pieces of hardware (plurality of processors or circuits, for example) sharing the processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Also, in the above-described embodiment, a case where the present invention is applied to an image capture apparatus has been described as an example, but there is no limitation thereto. For example, the techniques of displaying the tracking frame and the detection frame can be applied to an electronic apparatus having functions of displaying a shot image and of designating a position on the image. For example, the present invention can be applied to the touch operation that is performed when a shot image is reproduced, a face, an eye, a mouth, and a nose are detected, and thereafter the eye on which red-eye correction is to be performed is selected, or the face is selected by another reason (the name of a person is to be input, for example). Also, following cases are parts of processing that is to be performed after selecting a face or an organ. The entire face or an eye is selected so as to be pixelated or masked, an eye is selected so as to be subjected to processing for emphasizing the pupil (such as enlarging), a nose is selected so as to be subjected to image processing for emphasizing the nose by enlarging, and the entire face, a cheek, or the like is selected so as to be subjected to image processing having a skin beautifying effect. A mouth is selected so as to be subjected to image processing such as emphasizing the redness of or attaching glossiness to the lips. The above-described processing can be applied to a recorded image instead of the LV image, as a method of selecting an organ in the face in these cases. Also, the technique of displaying the AF frame can be applied to various types of electronic apparatuses having a shooting function. That is, the present invention can be applied to a personal computer, a PDA, a mobile phone terminal, a mobile image viewer, a printer apparatus that includes a display, a digital photo frame, a music player, a game machine, an electronic book reader, a seal printing system, and the like.

Also, in the above-described embodiment, a region on the display screen is designated by a touch operation on the touch panel, but there is no limitation thereto. For example, a region (face region or pupil region) on the screen may be designated by a mouse pointer, which is moved by operating a mouse. Also, in the above-described embodiment, a pupil is illustrated as an organ to be tracked, but there is no limitation thereto. For example, another organ such as a nose or a mouth may be designated as the tracking target (AF target). For example, when the mouth is the tracking target (AF target), the face region is vertically divided into two regions, and the lower region may be associated with the mouth, and the upper region may be associated with the face.

Also, the present invention can be applied, not only to an image capture apparatus itself, but also to a control apparatus that communicates with an image capture apparatus (including a network camera) via wired or wireless communication, and remotely controls the image capture apparatus. The apparatus that remotely controls an image capture apparatus includes a smartphone, tablet PC, and a desktop PC, for example. The control apparatus notifies an image capture apparatus of commands for causing the image capture apparatus to perform various types of operations and settings based on the operation performed on the control apparatus and the processing performed in the control apparatus, and as a result, the image capture apparatus can be remotely controlled. Also, the control apparatus may display a live view image that is shot by an image capture apparatus and is received via wired or wireless communication. In this case, such a control apparatus executes AF control to control the AF mechanism of the image capture apparatus. That is, the AF processing described in FIGS. 5A and 5B may be AF control for controlling an AF mechanism included in an external apparatus such as an image capture apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-201248, filed Oct. 17, 2017, No. 2017-201249, filed Oct. 17, 2017, and No. 2017-248004, filed Dec. 25, 2017, which are hereby incorporated by reference herein in their entirety.

What is claimed is:

1. An electronic apparatus comprising at least one processor or circuit to perform operations of:
a detection unit configured to detect a face and an organ of the face from an image;
a designation unit configured to designate a face or an organ detected by the detection unit as an AF target;
a setting unit configured to set one of a plurality of operation modes in which the AF targets designated by the designation unit are different,
an AF control unit configured to perform control such that AF is performed on an AF target designated by the designation unit, and
a display control unit configured to cause a display unit to display an AF result so as to be superimposed on the image,
wherein, when a first operation mode is set in which a face and an organ can be set as the AF target, even if a face is designated by the designation unit as the AF target, the AF control unit sets, if an organ of the designated face is detected by the detection unit, the detected organ as the AF target, and the display control unit displays the result of AF to the detected organ, and
when a second operation mode is set in which a face can be designated as the AF target, but an organ cannot be designated as the AF target, the AF control unit uses, if an organ of the face designated by the designation unit is detected by the detection unit, the detected organ as the AF target, and the display control unit displays the result of AF to the designated face.

2. The electronic apparatus according to claim 1, wherein, if the first operation mode is set, a face is designated by the designation unit as the AF target, and the AF control unit sets an organ of the designated face as the AF target, the display control unit displays, when displaying a result of AF, not an indicator indicating the designated face, but an indicator to the detected organ.

3. The electronic apparatus according to claim 1, wherein, if a first operation mode is set in which a face and an organ can be set as the AF target, the AF control unit, if a plurality of organs of the designated face have been detected by the detection unit, even if a face is designated by the designation unit as the AF target, set an organ automatically selected according to a predetermined condition, from the plurality of organs, as the AF target.

4. The electronic apparatus according to claim 1, wherein the detection unit detects an eye as the organ.

5. The electronic apparatus according to claim 4, wherein the designation unit is able to designate a right side eye and a left side eye by distinguishing therebetween, in the first operation mode.

6. The electronic apparatus according to claim 1, wherein the display control unit causes the display unit to display an item indicating a state of being detected by the detection unit to a face or an organ detected in the image.

7. The electronic apparatus according to claim 6, wherein the item indicating a state of being detected uses the same representation to a face and an organ.

8. The electronic apparatus according to claim 6, wherein the display control unit causes the display unit to display an item indicating a state of being designated by the designation unit to the designated face or organ in the image.

9. The electronic apparatus according to claim 8,
wherein the item indicating a state of being designated uses the same representation to a face and an organ, and
the representation of the item indicating a state of being detected is different from that of the item indicating a state of being designated.

10. The electronic apparatus according to claim 8, wherein the display control unit, when AF is executed under control of the AF control unit, hides the item indicating a state of being detected and the item indicating a state of being designated.

11. The electronic apparatus according to claim 6, wherein the representation of the AF result is different from those of the item indicating a state of being detected and the item indicating a state of being designated.

12. The electronic apparatus according to claim 1, wherein the designation unit designates the AF target based on a user operation to designate an AF target.

13. The electronic apparatus according to claim 1, further comprising a control unit configured to, if the face and an organ of the face are detected, set a face region corresponding to the face on a display screen in the display unit, divide the face region into a plurality of regions, and associate the regions with the face and the organ,
wherein the designation unit designates, according to a user operation to designate one of the plurality of regions, a face or an organ associated with the designated region as the AF target.

14. The electronic apparatus according to claim 13, wherein the designation unit includes a touch panel, and designates one of the plurality of regions based on a designated position indicated by a touch operation detected by the touch panel.

15. The electronic apparatus according to claim 14,
wherein the display unit includes a first display unit and a second display unit that is different from the first display unit, and
the designation unit determines a designated position on a display screen of the first display unit according to a first touch operation while the image is displayed in the first display unit, and determines a designated position on a display screen of the second display unit according to a second touch operation that is different from the first touch operation while the image is displayed in the second display unit.

16. A method of controlling an electronic apparatus, comprising:
detecting a face and an organ of the face from an image;
designating the detected face or organ as an AF target;
setting one of a plurality of operation modes in which AF targets that can be designated are different;
controlling so as to perform AF on an AF target designated in the designating; and
causing a display unit to display a result of AF so as to be superimposed on the image,
wherein, when a first operation mode, of the plurality of operation modes, is set in which a face and an organ can be designated as the AF target, if an organ of the designated face is detected even if a face is designated as the AF target, the detected organ is set as the AF target, and the result of AF is displayed to the detected organ, and
when a second operation mode is set in which a face can be designated as the AF target, but an organ cannot be designated as the AF target, if an organ of the designated face is detected, the detected organ is used as the AF target, and the result of AF is displayed to the designated face.

17. A non-transitory computer-readable storage medium that stores a program for causing a computer to execute a method for controlling an electronic apparatus, the method for controlling comprising:
detecting a face and an organ of the face from an image;
designating the detected face or organ as an AF target;
setting one of a plurality of operation modes in which AF targets that can be designated are different;
controlling so as to perform AF on an AF target designated in the designating; and
causing a display unit to display an AF result so as to be superimposed on the image,
wherein, when a first operation mode, of the plurality of operation modes, is set in which a face and an organ can be designated as the AF target, if an organ of the designated face is detected even if a face is designated as the AF target, the detected organ is set as the AF target, and the result of AF is displayed to the detected organ
when a second operation mode is set in which a face can be designated as the AF target, but an organ cannot be designated as the AF target, if an organ of the designated face is detected, the detected organ is used as the AF target, and the result of AF is displayed to the designated face.

18. An electronic apparatus comprising at least one processor or circuit to perform operations of:
a detection unit configured to detect a face and an organ of the face from an image;
a designation unit configured to designate a face or an organ detected by the detection unit as an AF target;
a setting unit configured to set one of a plurality of operation modes in which the AF targets designated by the designation unit are different,
an AF control unit configured to perform control such that AF is performed on an AF target designated by the designation unit, and
a display control unit configured to cause a display unit to display an AF result so as to be superimposed on the image,
wherein, when a first operation mode is set in which a face and an organ can be set as the AF target, even if a face is designated by the designation unit as the AF target, the AF control unit sets, if an organ of the designated face is detected by the detection unit, the detected organ as the AF target, and the display control unit displays the result of AF to the detected organ,
the display control unit causes the display unit to: display an item indicating a state of being detected by the detection unit to a face or an organ detected in the image; and display an item indicating a state of being designated by the designation unit to the designated face or organ in the image,
the item indicating a state of being designated uses the same representation to a face and an organ, and
the representation of the item indicating a state of being detected is different from that of the item indicating a state of being designated.

19. A method of controlling an electronic apparatus comprising:
detecting a face and an organ of the face from an image;
designating the detected face or organ as an AF target;
setting one of a plurality of operation modes in which the AF targets that can be designated are different,
controlling so as to perform AF on an AF target designated in the designating, and
causing a display unit to display an AF result so as to be superimposed on the image,
wherein, when a first operation mode, of the plurality of operation modes, is set in which a face and an organ can be designated as the AF target, if an organ of the designated face is detected even if a face is designated as the AF target, the detected organ is set as the AF target, and the result of AF is displayed to the detected organ, and
the display unit is controlled to: display an item indicating a state of being detected by the detection unit to a face or an organ detected in the image; and display an item indicating a state of being designated by the designation unit to the designated face or organ in the image,
the item indicating a state of being designated uses the same representation to a face and an organ, and
the representation of the item indicating a state of being detected is different from that of the item indicating a state of being designated.

20. A non-transitory computer-readable storage medium that stores a program for causing a computer to execute a method for controlling an electronic apparatus, the method for controlling comprising:
detecting a face and an organ of the face from an image;
designating the detected face or organ as an AF target;
setting one of a plurality of operation modes in which the AF targets that can be designated are different,
controlling so as to perform AF on an AF target designated in the designating, and
causing a display unit to display an AF result so as to be superimposed on the image, wherein, when a first operation mode, of the plurality of operation modes, is set in which a face and an organ can be designated as the AF target, if an organ of the designated face is detected even if a face is designated as the AF target, the detected organ is set as the AF target, and the result of AF is displayed to the detected organ, and the display unit is controlled to: display an item indicating a state of being detected by the detection unit to a face or an organ detected in the image; and display an item indicating a state of being designated by the designation unit to the designated face or organ in the image, the item indicating a state of being designated uses the same representation to a face and an organ, and the representation of the item indicating a state of being detected is different from that of the item indicating a state of being designated.

* * * * *